(12) United States Patent
Kato et al.

(10) Patent No.: US 10,720,863 B2
(45) Date of Patent: Jul. 21, 2020

(54) ELECTRIC POWER TOOL

(71) Applicant: MAKITA CORPORATION, Anjo-shi, Aichi (JP)

(72) Inventors: Itsuku Kato, Anjo (JP); Katsuna Hayashi, Anjo (JP); Kouichi Takeda, Anjo (JP); Hidenori Nagasaka, Anjo (JP); Takeshi Kamiya, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 0 days.

(21) Appl. No.: 16/379,893

(22) Filed: Apr. 10, 2019

(65) Prior Publication Data

US 2019/0319563 A1 Oct. 17, 2019

(30) Foreign Application Priority Data

Apr. 16, 2018 (JP) .................. 2018-078620

(51) Int. Cl.
*H02P 6/28* (2016.01)
*B23B 45/02* (2006.01)
*B23B 45/00* (2006.01)
*B25F 5/00* (2006.01)

(52) U.S. Cl.
CPC .............. *H02P 6/28* (2016.02); *B23B 45/008* (2013.01); *B23B 45/02* (2013.01); *B25F 5/001* (2013.01)

(58) Field of Classification Search
CPC ...... H02P 1/00; H02P 1/04; H02P 1/16; H02P 1/18; H02P 1/166; H02P 1/46; H02P 1/465; H02P 3/00; H02P 3/24; H02P 4/00; H02P 5/00; H02P 5/506; H02P 5/69; H02P 5/695; H02P 6/00; H02P 6/04; H02P 6/002; H02P 6/006; H02P 6/08; H02P 6/14; H02P 7/00; H02P 7/0038; H02P 7/06; H02P 7/29; H02P 7/2805; H02P 21/00; H02P 21/0032; H02P 21/0035; H02P 21/0021; H02P 21/0046; H02P 21/146; H02P 21/148; H02P 23/00; H02P 25/00; H02P 27/00; H02P 27/04; H02P 27/06; H02P 23/03; H02P 27/08; G05B 2219/41378; F16H 37/00; B23B 31/117

USPC .... 318/400.01, 400.02, 400.14, 400.15, 700, 318/701, 721, 727, 779, 799, 800, 801, 318/430, 432, 12, 15, 99; 903/917; 279/103, 110

See application file for complete search history.

(56) References Cited

U.S. PATENT DOCUMENTS 6,926,115 B2 * 8/2005 Masaki .................. G01L 5/221
                                                      180/446
9,966,816 B2 * 5/2018 Kokubo ................. H02K 7/116
2013/0314007 A1   11/2013 Yanagihara et al.

FOREIGN PATENT DOCUMENTS

WO       2012/108415 A1    8/2012

* cited by examiner

*Primary Examiner* — Antony M Paul
(74) *Attorney, Agent, or Firm* — Oliff PLC

(57) ABSTRACT

An electric power tool may include a three-phase brushless motor configured to drive a tool, a gear reducer provided between the motor and the tool. The gear reducer is configured to selectively change a reduction ratio from the motor to the tool between a first reduction ratio and a second reduction ratio. The electric power tool may further include a motor controller configured to drive the motor with rectangular waves. The motor controller is configured to selectively change a conduction angle of each rectangular wave between at least a first conduction angle and a second conduction angle.

20 Claims, 17 Drawing Sheets

ELECTRIC POWER TOOL

CROSS-REFERENCE

This application claims priority to Japanese Patent Application No. 2018-078620, filed on Apr. 16, 2018, the entire contents of which are incorporated herein by reference.

TECHNICAL FIELD

The disclosure herein relates to an electric power tool, and especially relates to an electric power tool provided with a three-phase brushless motor.

TECHNICAL FIELD

International Publication No. WO2012/108415 describes an electric power tool. This electric power tool is provided with a three-phase brushless motor configured to drive a tool, and a motor controller configured to drive the motor with rectangular waves. The motor controller is configured to selectively change a conduction angle in the rectangular wave drive between at least two angles.

SUMMARY

An electric power tool is used in various types of work and is required to operate according to the types of work. For example, in a case with an electric screwdriver drill, it is desirable to drive a tool (driver bit) at a high speed when a small screw is to be tightened or a narrow drill is used, while it is desirable to drive the tool with high torque when a large screw is to be tightened or a large drill is used. In regard to this feature, the aforementioned electric power tool can drive the tool at a high speed by increasing the conduction angle, and can drive the tool with high torque by decreasing the conduction angle. The disclosure herein provides a technique that can implement a new and useful electric power tool by utilizing the aforementioned technique.

An electric power tool may comprise a three-phase brushless motor configured to drive a tool, a gear reducer provided between the motor and the tool. The gear reducer is configured to selectively change a reduction ratio from the motor to the tool between a first reduction ratio and a second reduction ratio. The electric power tool may further comprise a motor controller configured to drive the motor with rectangular waves. The motor controller is configured to selectively change a conduction angle of each rectangular wave between at least a first conduction angle and a second conduction angle. The first conduction angle and the second conduction angle may be, but not limited to, any angle within a range from 120 degrees to 180 degrees.

According to the aforementioned electric power tool, a relationship between rotational speed and torque (a so-called speed-torque characteristic) outputted by the electric power tool can be adjusted by selectively changing both the reduction ratio in the gear reducer and the conduction angle in the motor controller. Especially, by changing the reduction ratio in the gear reducer, the speed-torque characteristic of the electric power tool can be changed relatively significantly. Contrary to this, by changing the conduction angle in the motor controller, the speed-torque characteristic of the electric power tool can be changed relatively finely. Due to this, by combining these, the speed-torque characteristic of the electric power tool can suitably be adjusted according to work in which the electric power tool is used.

DETAILED DESCRIPTION

Figure 1:
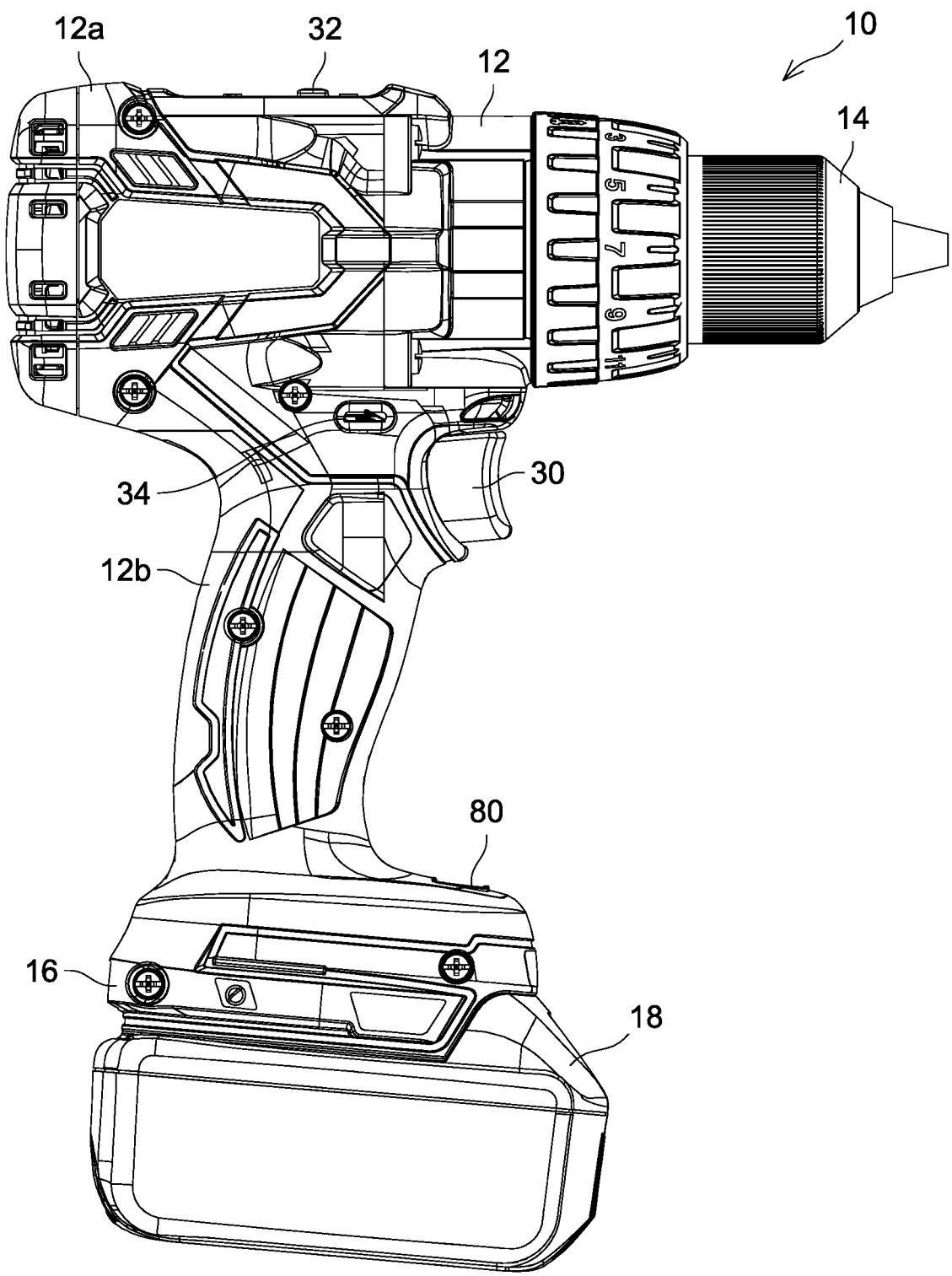
FIG. 1 is a side view showing an outer appearance of an electric power tool 10 according to an embodiment.

In an embodiment of the technique disclosed herein, a motor controller may be configured to selectively perform a first drive mode in which a conduction angle is maintained at a fixed conduction angle and a second drive mode in which the conduction angle is selectively changed between at least a first conduction angle and a second conduction angle. According to such a configuration, the electric power tool can selectively use the first drive mode and the second drive mode in accordance with work in which the electric power tool is used. For example, for work that does not require the conduction angle to be changed, the electric power tool can avoid an unnecessary change in the conduction angle by selecting the first drive mode.

In an embodiment of the technique disclosed herein, the electric power tool may further comprise at least one manipulation member configured to be manipulated by a user. In this case, the motor controller may be configured to selectively perform either the first drive mode or the second drive mode in accordance with manipulation applied to the at least one manipulation member.

In the aforementioned embodiment, the at least one manipulation member may comprise a first manipulation member for switching between the first drive mode and the second drive mode. In this case, the motor controller may be configured to selectively perform either the first drive mode or the second drive mode in accordance with manipulation applied to the first manipulation member. That is, the first manipulation member may be a manipulation member dedicated to switching the drive modes, and may not have other functions.

In addition to or as an alternative of the above, the at least one manipulation member may comprise a second manipulation member for changing the reduction ratio of the gear reducer between the first reduction ratio and the second reduction ratio. In this case, the motor controller may be configured to selectively perform either the first drive mode or the second drive mode in accordance with manipulation applied to the second manipulation member.

According to such a configuration, the drive mode of the motor controller is automatically changed when the user changes the reduction ratio of the gear reducer.

As an example, the second manipulation member may be configured to be manipulated between a first position and a second position by the user. In this case, when the second manipulation member is manipulated to the first position, the gear reducer may set the reduction ratio at the first reduction ratio and the motor controller may select the first drive mode. On the other hand, when the second manipulation member is manipulated to the second position, the gear reducer may set the reduction ratio at the second reduction ratio and the motor controller may select the second drive mode. According to such a configuration, the first drive mode in which the conduction angle is fixed and the second drive mode in which the conduction angle is changed are selectively performed in accordance with the reduction ratio of the gear reducer selected by the user.

In the aforementioned embodiment, the second reduction ratio may be smaller than the first reduction ratio. According to such a configuration, when the user selects the second reduction ratio, that is, when the user wishes to drive the tool at a high speed, the motor controller performs the second drive mode to change the conduction angle. For example, the electric power tool can drive the tool at even higher speed by having the conduction angle set to an angle larger than 120 degrees.

In addition to or as an alternative of the first manipulation member and/or the second manipulation member described above. the at least one manipulation member may comprise a third manipulation member for switching a rotational direction of the tool between a forward direction and a reverse direction. In this case, the motor controller may be configured to selectively perform either the first drive mode or the second drive mode in accordance with manipulation applied to the third manipulation member. According to such a configuration, the first drive mode in which the conduction angle is fixed and the second drive mode in which the conduction angle is changed can be selectively performed in accordance with the rotational direction of the tool selected by the user.

As an example, the third manipulation member may be configured to be manipulated between a third position and a fourth position by the user. In this case, when the third manipulation member is manipulated to the third position, the rotational direction of the tool may be set to the forward direction and the motor controller may select the second drive mode. On the other hand, when the third manipulation member is manipulated to the fourth position, the rotational direction of the tool may be set to the reverse direction and the motor controller may select the first drive mode. According to such a configuration, the motor controller performs the first drive mode when the rotational direction of the motor is set in the reverse direction to avoid an unnecessary change in the conduction angle.

In an embodiment of the technique disclosed herein. the at least one manipulation member may comprise both the second manipulation member configured to be manipulated between the first position and the second position by the user and the third manipulation member configured to be manipulated between the third position and the fourth position by the user. In this case, the second manipulation member may be configured such that the reduction ratio of the gear reducer is set to the first reduction ratio when the second manipulation member is manipulated to the first position, and such that the reduction ratio of the gear reducer is set to the second reduction ratio when the second manipulation member is manipulated to the second position. Further, the third manipulation member may be configured such that the rotational direction of the tool is set to the forward direction when the third manipulation member is manipulated to the third position. and such that the rotational direction of the tool is set to the reverse direction when the third manipulation member is manipulated to the fourth position. Further. the motor controller may be configured to select the second drive mode only when the second manipulation member is manipulated to the second position and the third manipulation member is manipulated to the third position. According to such a configuration, the conduction angle is changed only when the user wishes to drive the tool at a high speed in the forward direction, and the change in the conduction angle can be prohibited otherwise.

In an embodiment of the technique disclosed herein, the motor controller may be configured to change the conduction angle in accordance with a condition index which varies depending on load applied to the tool. According to such a configuration, the electric power tool can suitably change the conduction angle in accordance with its actual work content or work state. For example, in a case where the load applied to the tool is small, the electric power tool can drive the tool at a higher speed by increasing the conduction angle.

Although the aforementioned condition index is not particularly limited, the condition index may be at least one index selected from a group consisting of: a current of the motor, a rotational speed of the motor, a temperature of the motor, a voltage of a battery which supplies electric power to the motor, and a temperature of a switching element of the motor controller. These indexes correspond to the load applied to the tool and are relatively easy to detect by applicable detectors and the like.

The motor controller may be configured to store at least one threshold value regarding the aforementioned condition index. In this case, the motor controller may change the conduction angle based on a magnitude relationship between the condition index and the at least one threshold value. Although this is merely an example, in a case where the condition index is the current of the motor, the motor controller may set the conduction angle to the first conduction angle when the current of the motor exceeds the threshold value, and may set the conduction angle to the second conduction angle when the current of the motor is below the threshold value. In this case, the second conduction angle may be an angle that is larger than the first conduction angle.

The at least one threshold value as aforementioned may include a first threshold value and a second threshold value. In this case, the motor controller may be configured to change the conduction angle to the second conduction angle based on a magnitude relationship between the condition index and the first threshold value when the conduction angle is set at the first conduction angle. Further, the motor controller may be configured to change the conduction angle to the first conduction angle based on a magnitude relationship between the condition index and the second threshold value when the conduction angle is set at the second conduction angle. According to such a configuration, an unnecessary change in the conduction angle can be avoided even in a case where the condition index varies with very small amplitude near the threshold value.

Alternatively, the at least one threshold value as aforementioned may include a first threshold value, a second threshold value, a third threshold value, and a fourth threshold value. In this case, the motor controller may be configured to change the conduction angle to the second conduction angle based on a magnitude relationship between the condition index and the first threshold value when the reduction ratio of the gear reducer is set at the first reduction ratio and the conduction angle is set at the first conduction angle. Further, the motor controller may be configured to change the conduction angle to the first conduction angle based on a magnitude relationship between the condition index and the second threshold value when the reduction ratio of the gear reducer is set at the first reduction ratio and the conduction angle is set at the second conduction angle. Further, the motor controller may be configured to change the conduction angle to the second conduction angle based on a magnitude relationship between the condition index and the third threshold value when the reduction ratio of the gear reducer is set at the second reduction ratio and the conduction angle is set at the first conduction angle. Further, the motor controller may be configured to change the conduction angle to the first conduction angle based on a magnitude relationship between the condition index and the fourth threshold value when the reduction ratio of the gear reducer is set at the second reduction ratio and the conduction angle is set at the second conduction angle. According to such a configuration, the condition index at a time when the conduction angle is to be changed can be changed in accordance with the selected reduction ratio of the gear reducer.

In an embodiment of the technique disclosed herein, the electric power tool may further comprise a notifier configured to notify the conduction angle set by the motor controller. In addition thereto or as an alternative thereof, the electric power tool may further comprise a notifier configured to notify the reduction ratio set by the gear reducer.

In an embodiment of the technique disclosed herein, the electric power tool may further comprise a first detector configured to detect the reduction ratio set by the gear reducer. In this case, the first detector may comprise a contact sensor, such as a contact switch. Alternatively, the first detector may comprise a non-contact sensor, such as a Hall element.

In addition to or as an alternative to the above, the electric power tool may further comprise a second detector configured to detect a rotational speed of the tool. In this case, the motor controller may be configured to detect the reduction ratio set by the gear reducer based on a detected value by the second detector. That is, the motor controller may detect the reduction ratio set by the gear reducer based on a relationship (such as a ratio) between the rotational speed of the motor which the motor controller is driving and the detected rotational speed of the tool.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric power tools, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment

Figure 2:
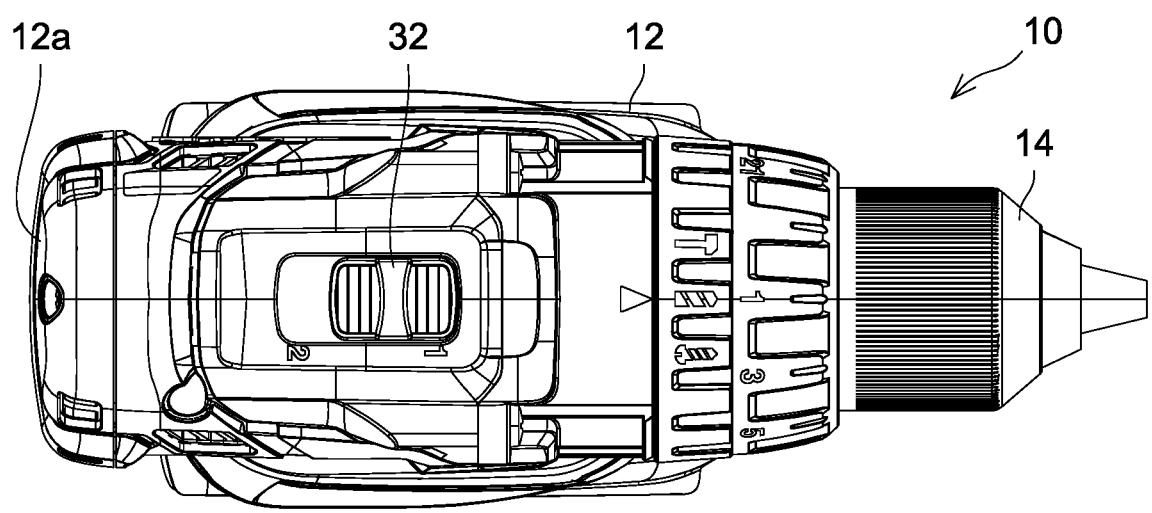
FIG. 2 is a plan view showing the outer appearance of the electric power tool 10 according to the embodiment.

An electric power tool 10 according to an embodiment will be described with reference to the drawings. Although this is merely an example, the electric power tool 10 according to the present embodiment is an electric screwdriver drill and is configured to drive a tool (such as a driver bit) engaged with a screw or a bolt by electric power. As shown in FIGS. 1 and 2, the electric power tool 10 is provided with a housing 12 and a tool chuck 14 provided rotatable relative to the housing 12. The tool chuck 14 is configured to have a tool such as a driver bit detachably attached thereto. The technique explained in the present embodiment is not limited to the electric screwdriver drill, and can be applied to various types of electric power tools.

The housing 12 primarily includes a cylindrical main body 12a and a grip 12b extending from the main body 12a. The tool chuck 14 is positioned at a front end of the main body 12a. The grip 12b is to be gripped by a user. A battery interface 16 is provided at a distal end of the grip 12b. The battery interface 16 detachably receives a battery pack 18 which is a power source of the electric power tool 10. As another embodiment, the electric power tool 10 may not be a cordless device using the battery pack 18 as the power source, but may be a corded device that is to be connected to a commercial power source (such as an electric outlet).

Figure 3:
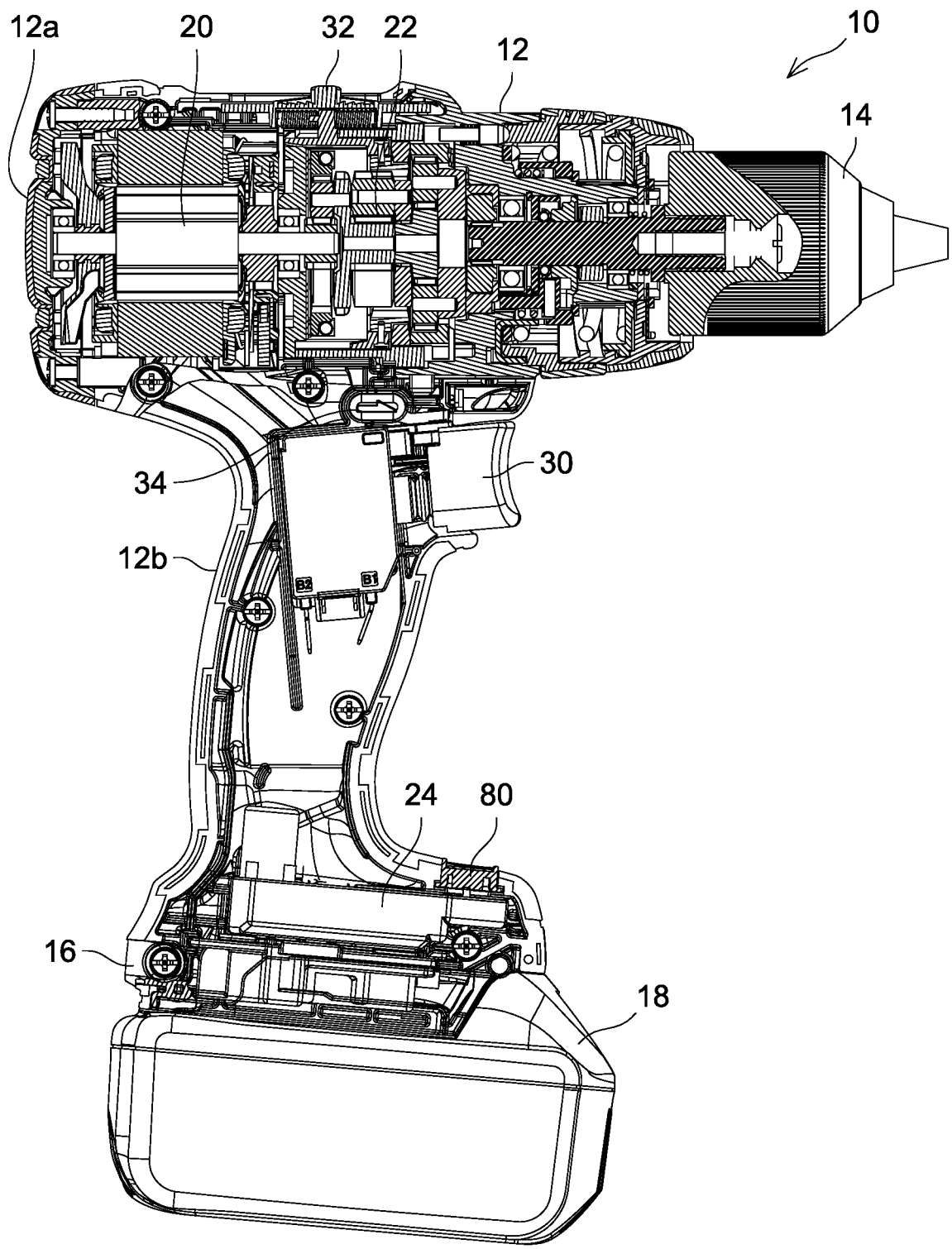
FIG. 3 is a cross-sectional view showing an internal structure of the electric power tool 10 according to the embodiment.

As shown in FIG. 3, the housing 12 comprises therein a motor 20 for driving the tool chuck 14 (that is, the tool), a gear reducer 22 provided between the motor 20 and the tool chuck 14, and a motor controller 24 configured to control operation of the motor 20. The motor 20 is a three-phase brushless motor. Electric power is supplied from the battery pack 18 to the motor 20 via the motor controller 24. A rotational motion of the motor 20 is transmitted to the tool chuck 14 through the gear reducer 22. At this occasion, the gear reducer 22 reduces a rotational speed and increases torque in accordance with its reduction ratio. The gear reducer 22 is configured to selectively change the reduction ratio. Although this is merely an example, the gear reducer 22 of the present embodiment is configured to change the reduction ratio between a first reduction ratio and a second reduction ratio. The second reduction ratio is smaller than the first reduction ratio. That is, when the reduction ratio of the gear reducer 22 is changed from the first reduction ratio to the second reduction ratio, a rotational speed of the tool chuck 14 increases while torque of the tool chuck 14 decreases.

A specific configuration of the gear reducer 22 is not particularly limited. The gear reducer 22 may include any configuration so long as it is configured to selectively change the reduction ratio between at least two reduction ratios. Although this is merely an example, the gear reducer 22 according to the present embodiment incudes a plurality of planetary gear mechanisms connected serially and is configured to change the reduction ratio by switching a part of the planetary gear mechanisms between activated and deactivated states. This feature will be described later in further detail.

The electric power tool 10 is provided with several manipulation members. These manipulation members are each configured to be manipulated by the user. For example, the electric power tool 10 includes a trigger switch 30. The trigger switch 30 is an example of the manipulation member that is manipulated by the user to actuate and stop actuating the electric power tool 10. The trigger switch 30 may be replaced with another type of switch or manipulation member. Although not particularly limited, the trigger switch 30 is provided in a vicinity of a proximal end of the grip 12b. When the user manipulates the trigger switch 30 the electric power tool 10 drives the motor 20 to rotate, and when the user releases the manipulation of the trigger switch 30 the electric power tool 10 stops driving the motor 20.

Figure 4:
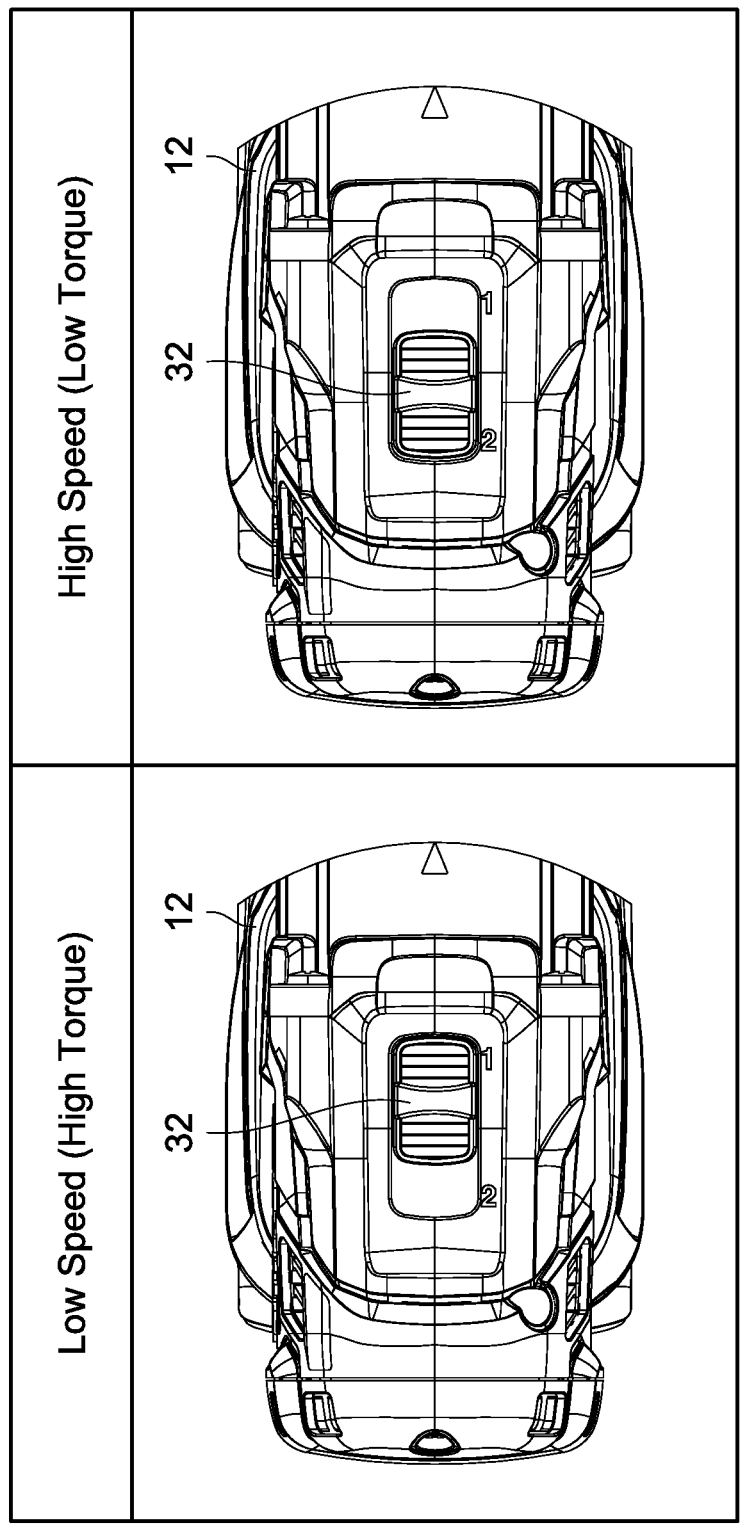
FIG. 4 shows a gear selection switch 32 manipulated between a first position and a second position.

The electric power tool 10 further includes a gear selection switch 32. The gear selection switch 32 is an example of the manipulation member that is manipulated by the user for changing the reduction ratio of the gear reducer 22. Although not particularly limited, the gear selection switch 32 according to the present embodiment is a sliding switch and is provided on an upper surface of the main body 12a of the housing 12. The gear selection switch 32 may be replaced with another type of switch or manipulation member. As shown in FIG. 4, the gear selection switch 32 is configured to be manipulated between a first position for a low-speed drive (that is, for a high-torque drive) and a second position for a high-speed drive (that is, for a low-torque drive). A left section in FIG. 4 shows the gear selection switch 32 in the first position and a right section in FIG. 4 shows the gear selection switch 32 in the second position. When the gear selection switch 32 is manipulated to the first position, the reduction ratio of the gear reducer 22 is set to the first reduction ratio. When the gear selection switch 32 is manipulated to the second position, the reduction ratio of the gear reducer 22 is set to the second reduction ratio.

The electric power tool 10 further includes a rotational direction selection switch 34. The rotational direction selection switch 34 is an example of the manipulation member for switching a rotational direction of the tool chuck 14 (that is, a rotational direction of the tool) between a forward direction and a reverse direction. Although not particularly limited, the rotational direction selection switch 34 according to the present embodiment is provided on a side surface of the main body 12a of the housing 12. The rotational direction selection switch 34 may be replaced with another type of switch or manipulation member. The rotational direction selection switch 34 is configured to be manipulated between a third position for the forward direction and a fourth position for the reverse direction. When the rotational direction selection switch 34 is manipulated to the third position, the rotational direction of the tool chuck 14 is set to the forward direction. When the rotational direction selection switch 34 is manipulated to the fourth position, the rotational direction of the tool chuck 14 is set to the reverse direction.

Figure 5:
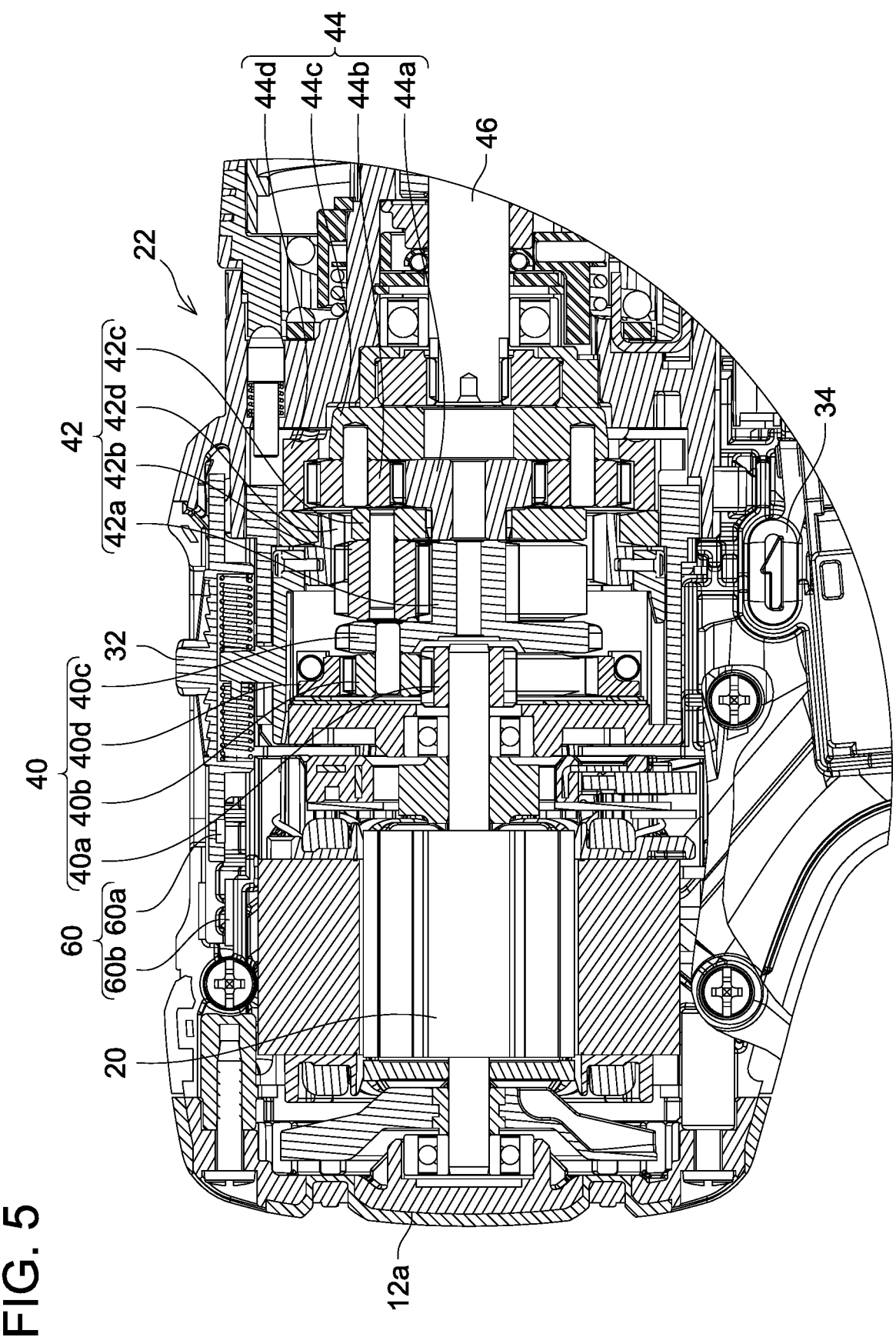
FIG. 5 is a cross-sectional view showing a gear reducer 22 when the gear selection switch 32 is in the first position.
Figure 6:
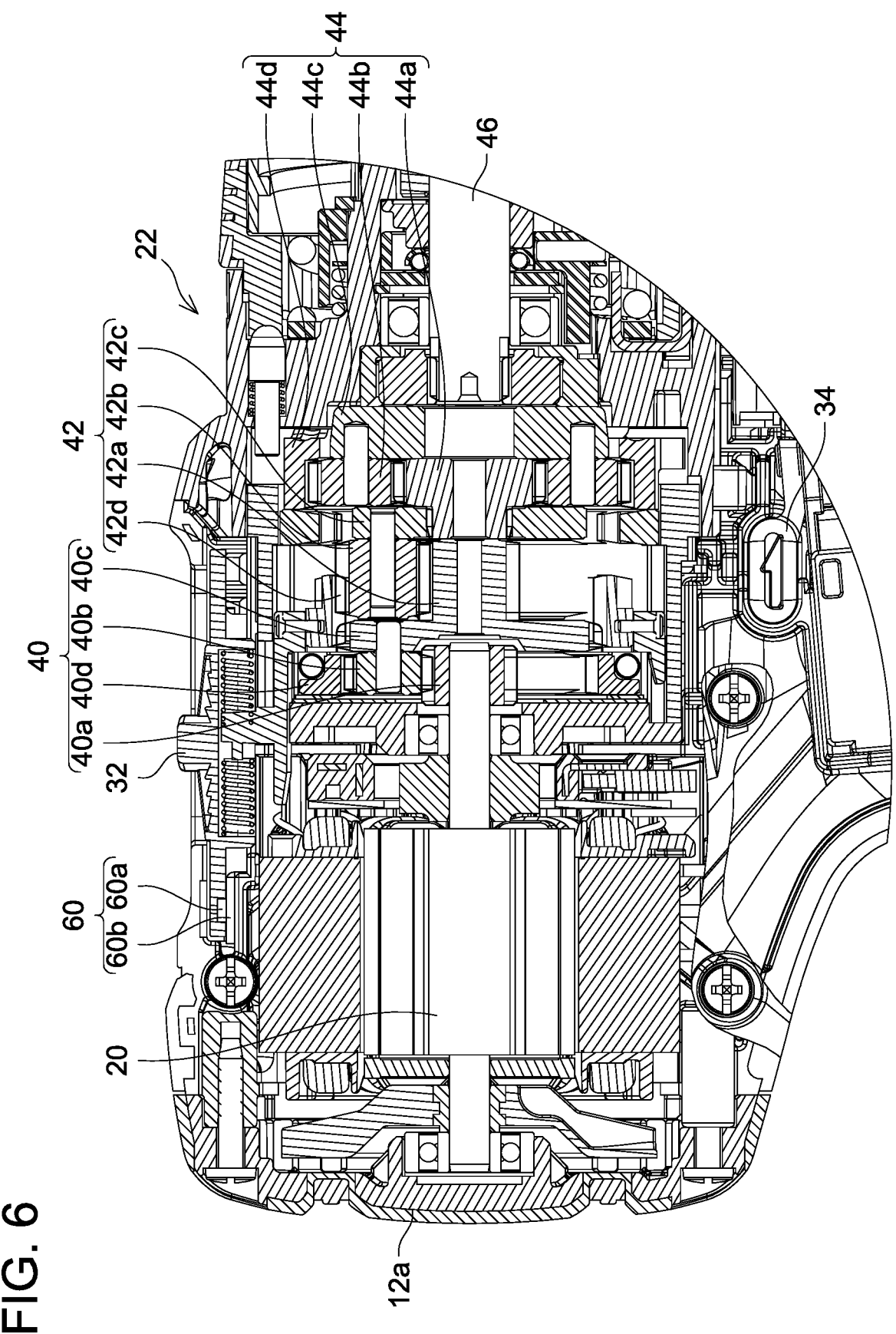
FIG. 6 is a cross-sectional view showing the gear reducer 22 when the gear selection switch 32 is in the second position.

A configuration of the gear reducer 22 and cooperation between the gear reducer 22 and the gear selection switch 32 according to the present embodiment will be described with reference to FIGS. 5 and 6. As shown in FIGS. 5 and 6, the gear reducer 22 includes a first planetary gear mechanism 40, a second planetary gear mechanism 42, and a third planetary gear mechanism 44. The first planetary gear mechanism 40 includes a first sun gear 40a, a plurality of first planetary gears 40b, a first carrier 40c supporting the plurality of first planetary gears 40b in a rotatable manner, and a first ring gear 40d. The first sun gear 40a is connected to the motor 20 and meshes with the plurality of first planetary gears 40b from an inner side. The first ring gear 40d is fixed to the housing 12 in a non-rotatable manner and meshes with the plurality of first planetary gears 40b from an outer side.

The second planetary gear mechanism 42 includes a second sun gear 42a, a plurality of second planetary gears 42b, a second carrier 42c supporting the plurality of second planetary gears 42b in a rotatable manner, and a second ring gear 42d. The second sun gear 42a is coaxially fixed to the first carrier 40c and meshes with the plurality of second planetary gears 42b from an inner side. The second ring gear 42d is fixed to the housing 12 in a non-rotatable manner and meshes with the plurality of second planetary gears 42b from an outer side. Here, the second ring gear 42d is slidable along its rotational axis and is connected to the gear selection switch 32. The third planetary gear mechanism 44 includes a third sun gear 44a, a plurality of third planetary gears 44b, a third carrier 44c supporting the plurality of third planetary gears 44b in a rotatable manner, and a third ring gear 44d. The third sun gear 44a is coaxially fixed to the second carrier 42c and meshes with the plurality of third planetary gears 44b from an inner side. The third ring gear 44d is fixed to the housing 12 in a non-rotatable manner and meshes with the plurality of third planetary gears 44b from an outer side. Further, the third carrier 44c is connected to the tool chuck 14 via an output shaft 46.

As shown in FIG. 5, when the gear selection switch 32 is in the first position, the second ring gear 42d is separated from the first carrier 40c. In this state, the three planetary gear mechanisms 40, 42, 44 all function, by which the reduction ratio of the gear reducer 22 is set to the first reduction ratio. Contrary to this, as shown in FIG. 6, when the gear selection switch 32 is in the second position, the second ring gear 42d approaches the first carrier 40c and meshes with the the first carrier 40c as well as the plurality of second planetary gears 42b. Due to this, the first carrier 40c and the second carrier 42c are coupled so as to be incapable of rotating relative to each other, and the second planetary gear mechanism 42 is thereby deactivated. As a result, the reduction ratio of the gear reducer 22 becomes the second reduction ratio which is smaller than the first reduction ratio. The reduction ratio described herein means a value obtained by dividing an input-side rotational speed by an output-side rotational speed. For example, when the reduction ratio of the gear reducer 22 is 50, the tool chuck 14 rotates twice when the motor 20 rotates 100 times.

As shown in FIGS. 5 and 6, a gear position detector 60 is provided. The gear position detector 60 is configured to detect the reduction ratio set in the gear reducer 22. Although this is merely an example, the gear position detector 60 according to the present embodiment includes a magnet 60a and a Hall element 60b. The magnet 60a is provided on the gear selection switch 32 and the Hall element 60b is fixed to the housing 12 in a vicinity of the gear selection switch 32. When the gear selection switch 32 is manipulated to the second position, the magnet 60a provided on the gear selection switch 32 approaches the Hall element 60b and magnetic force of the magnet 60a is detected by the Hall element 60b. On the other hand, when the gear selection switch 32 is manipulated to the first position, the magnet 60a provided on the gear selection switch 32 separates away from the Hall element 60b. In this case, the magnetic force of the magnet 60a is not detected by the Hall element 60b. As above, the gear position detector 60 according to the present embodiment can detect whether the reduction ratio set by the gear reducer 22 is the first reduction ratio or the second reduction ratio by detecting the position of the gear selection switch 32. The gear position detector 60 is not limited to the combination of the magnet 60a and the Hall element 60b. The gear position detector 60 may include another non-contact sensor or may include a contact sensor such as a contact switch.

Next, an electric configuration of the electric power tool 10 will be described with reference to FIG. 7. As aforementioned, the electric power tool 10 comprises the three-phase brushless motor 20 and the motor controller 24 configured to control the operation of the motor 20. The motor controller 24 is provided with an inverter circuit 50, a gate driver 52, and a microprocessor 54. The inverter circuit 50 is provided between the battery pack 18 and the motor 20. The inverter circuit 50 includes a plurality of switching elements Q1 to Q6 and converts DC power from the battery pack 18 to AC power to be supplied to the motor 20. The plurality of switching elements Q1 to Q6 is not particularly limited, but they are field effect transistors (FETs). The gate driver 52 is configured to selectively turn on and turn off the switching elements Q1 to Q6 in accordance with motor driving instructions from the microprocessor 54. The motor driving instructions are not particularly limited, but they may be pulse width modulation signals. The motor controller 24 is further provided with a regulator 82 which is a power source of the microprocessor 54 and a power controller 84 configured to control the regulator 82. Further, the aforementioned gear position detector 60 is connected to the microprocessor 54.

The electric power tool 10 is further provided with a trigger manipulation detector 72 and a manipulated amount detector 74. The trigger manipulation detector 72 detects manipulation of the trigger switch 30 by the user, and the manipulated amount detector 74 detects a manipulated amount of the trigger switch 30 by the user. The trigger manipulation detector 72 and the manipulated amount detector 74 are connected to the microprocessor 54 of the motor controller 24. Due to this, the motor controller 24 drives the motor 20 when the user manipulates the trigger switch 30, and the motor controller 24 stops driving the motor 20 when the user releases the manipulation of the trigger switch 30. Further, the motor controller 24 adjusts the power supplied to the motor 20 in accordance with the manipulated amount of the trigger switch 30 detected by the manipulated amount detector 74. Due to this, the motor controller 24 can adjust the rotational speed of the motor 20 in accordance with the manipulated amount of the trigger switch 30 by the user.

As described above, the rotational direction of the tool chuck 14 (that is, the rotational direction of the tool) is switched by the rotational direction selection switch 34. The rotational direction selection switch 34 is connected to the motor controller 24. The motor controller 24 switches a rotational direction of the motor 20 between the forward direction and the reverse direction in accordance with an output signal from the rotational direction selection switch 34. Due to this, the rotational direction of the tool chuck 14 is switched between the forward direction and the reverse direction.

Figure 8:
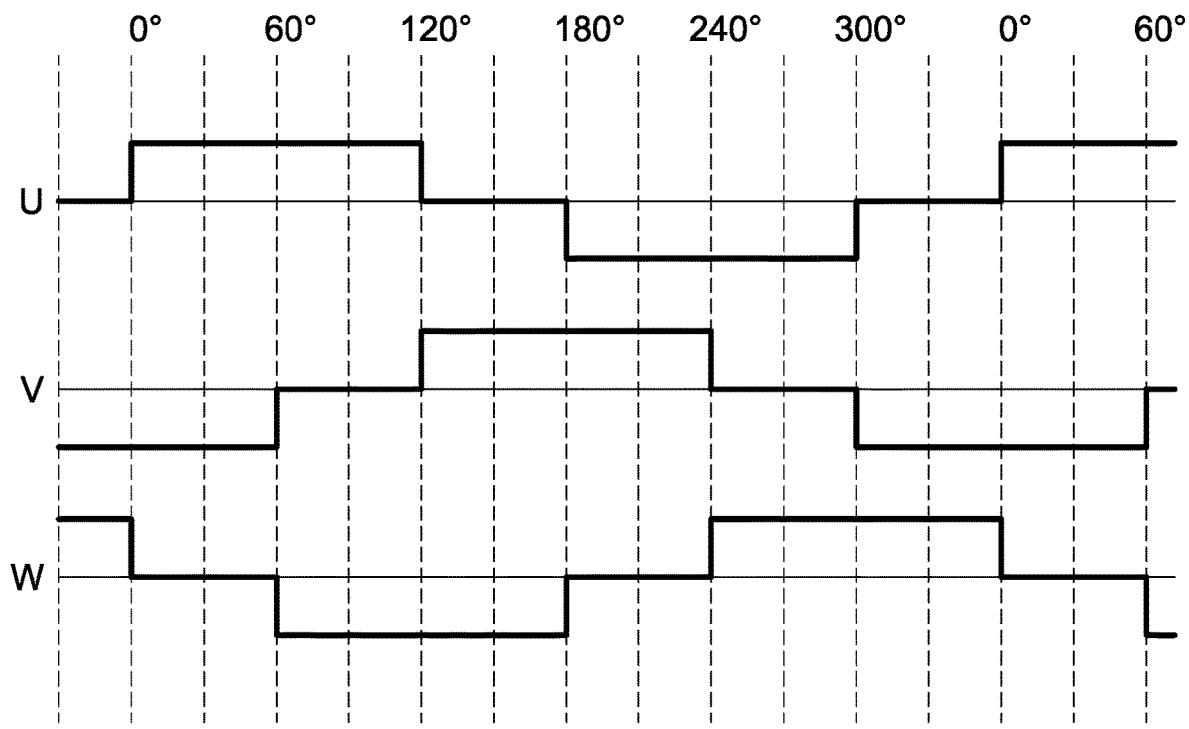
FIG. 8 shows voltage waveforms supplied to a motor 20 when a conduction angle is 120 degrees.
Figure 9:
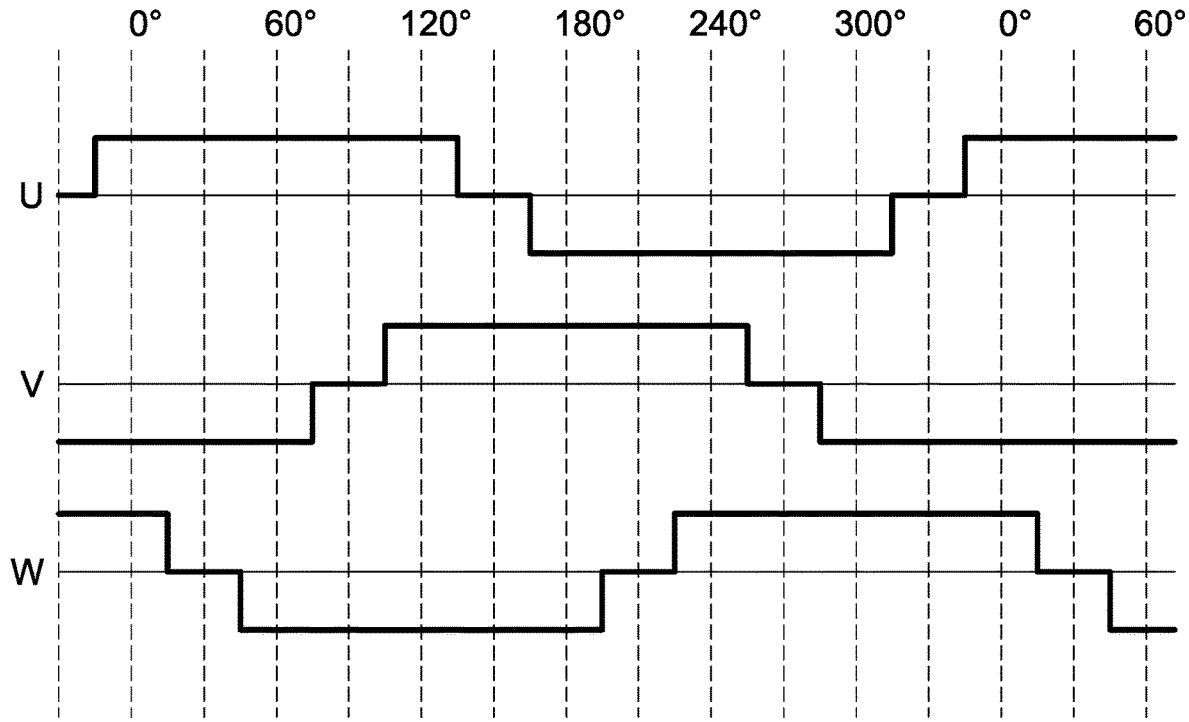
FIG. 9 shows voltage waveforms supplied to the motor 20 when the conduction angle is 150 degrees.

The electric power tool 10 is provided with a motor position detector 56 for detecting a rotational position of the motor 20. The motor position detector 56 is connected to the microprocessor 54 of the motor controller 24. The motor controller 24 controls the three-phase AC power supplied to the motor 20 in accordance with the detected rotational position of the motor 20. FIGS. 8 and 9 show voltage waveforms of the three-phase AC power supplied to the motor 20. As shown in FIGS. 8 and 9, the motor controller 24 drives the motor 20 with rectangular waves, and a voltage applied to the motor 20 changes in a rectangular wave pattern in accordance with the rotational position of the motor 20. Here, the motor controller 24 can change a conduction angle in the rectangular wave drive of the motor 20 rectangular wave in a range from 120 to 150 degrees. FIG. 8 shows voltage waveforms in a case where the conduction angle is set to 120 degrees and FIG. 9 shows voltage waveforms in a case where the conduction angle is set to 150 degrees.

Figure 10:
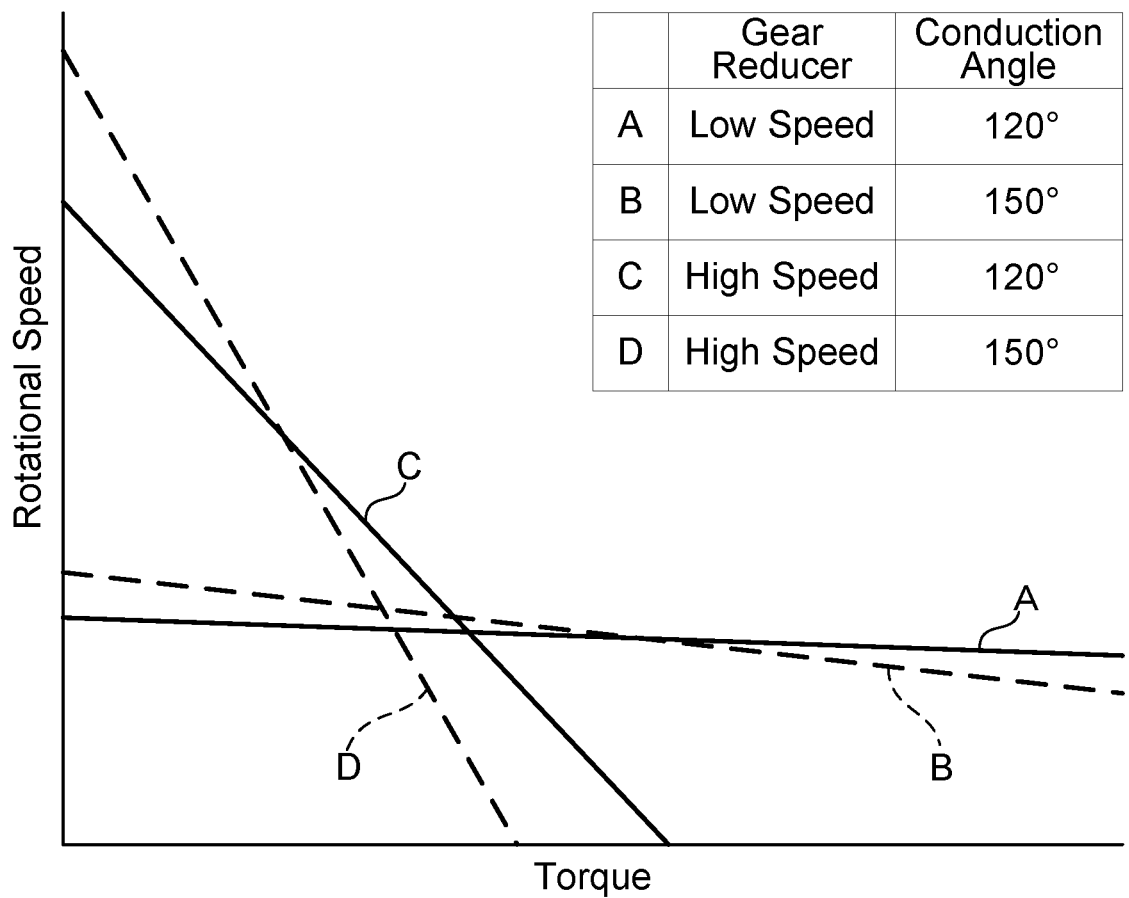
FIG. 10 shows speed-torque characteristics of the electric power tool 10 according to the embodiment.

FIG. 10 shows relationships between rotational speed and torque which the electric power tool 10 outputs (that is, speed-torque characteristics of the tool chuck 14). "A" in the drawing indicates the speed-torque characteristic when the reduction ratio of the gear reducer 22 is set at the first reduction ratio and the conduction angle is set at 120 degrees. "B" in the drawing indicates the speed-torque characteristic when the reduction ratio of the gear reducer 22 is set at the first reduction ratio and the conduction angle is set at 150 degrees. "C" in the drawing indicates the speed-torque characteristic when the reduction ratio of the gear reducer 22 is set at the second reduction ratio and the conduction angle is set at 120 degrees. "D" in the drawing indicates the speed-torque characteristic when the reduction ratio of the gear reducer 22 is set at the second reduction ratio and the conduction angle is set at 150 degrees. As shown in FIG. 10, the speed-torque characteristic of the electric power tool 10 changes not only in accordance with the reduction ratio of the gear reducer 22 but also in accordance with the conduction angle in the motor controller 24. Especially, in a situation where a load applied to the electric power tool 10 (that is, the tool chuck 14) is small, an increase in the conduction angle causes the torque to decrease and the rotational speed to increase.

In the electric power tool 10 according to the present embodiment, the speed-torque characteristic of the electric power tool 10 can be adjusted by both the change in the reduction ratio of the gear reducer 22 and the change in the conduction angle of the motor controller 24. Especially, by changing the reduction ratio in the gear reducer 22, the speed-torque characteristic of the electric power tool 10 can be changed relatively significantly. On the other hand, by changing the conduction angle in the motor controller 24, the speed-torque characteristic of the electric power tool 10 can be changed relatively finely. Due to this, by combining the aforementioned changes, the speed-torque characteristic of the electric power tool 10 can suitably be adjusted for work in which the electric power tool 10 is used. The conduction angle is not limited to 120 degrees and 150 degrees. The conduction angle may be changed between at least two angles, which are included in a range from 120 degrees or more to 180 degrees or less, for example.

Figure 11:
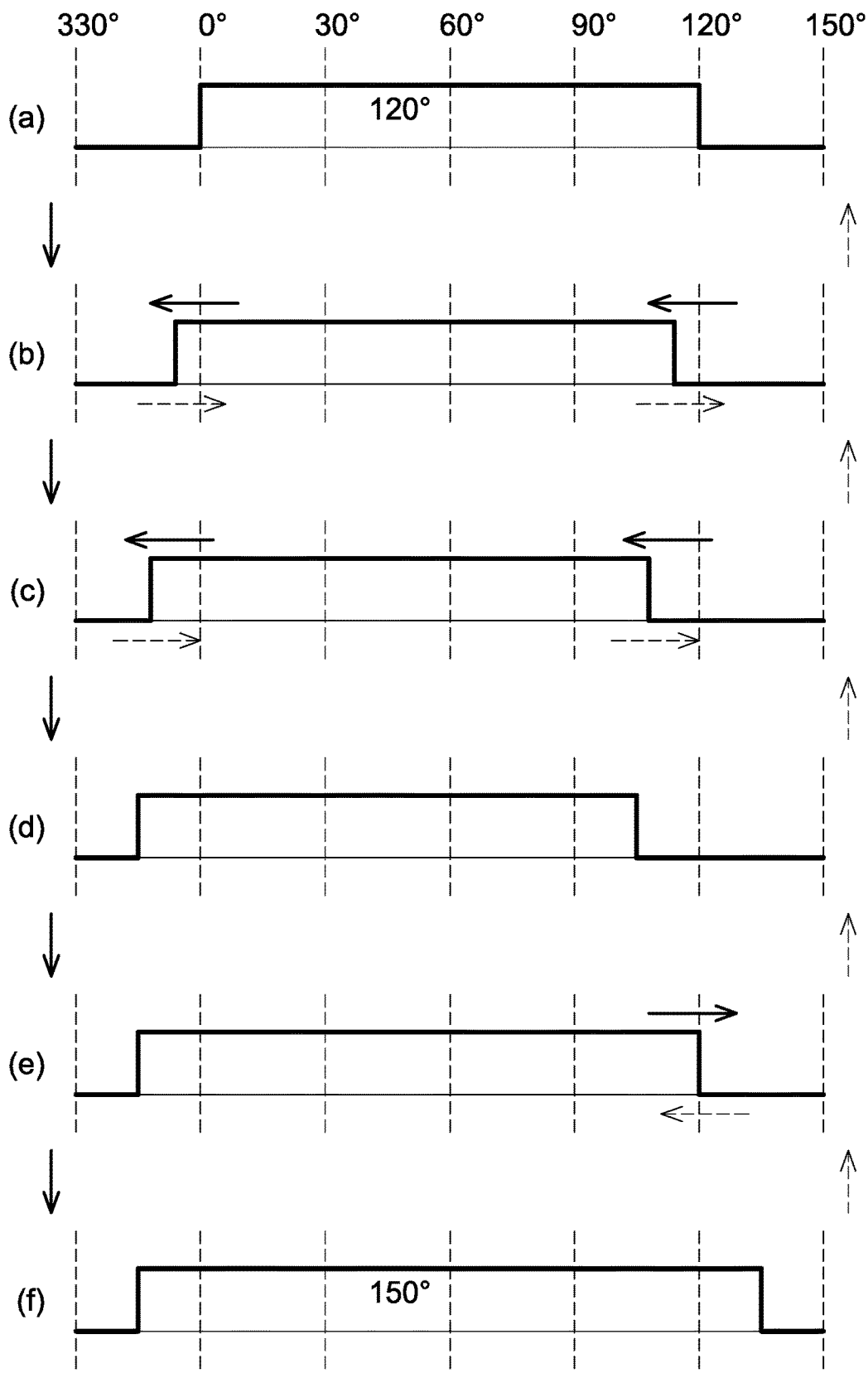
FIG. 11 shows how the conduction angle is changed gradually between 120 and 150 degrees.

When the conduction angle is changed significantly in a short period of time, a number of rotations of the motor 20 also changes significantly, by which the user may feel strong discomfort. Due to this, the conduction angle may be changed gradually over a certain period of time. In regard to this point, an example of procedure to change the conduction angle is shown in FIG. 11. As shown in FIG. 11, in a case where the conduction angle is increased from 120 degrees to 150 degrees, the voltage waveform applied to the motor 20 is changed in an order from (a) to (f). That is, firstly, the motor controller 24 makes a conduction start timing gradually earlier while maintaining the conduction angle (a→b→c→d), and thereafter gradually increases the conduction angle while maintaining the conduction start timing (d→e→f). On the other hand, in a case where the conduction angle is decreased from 150 degrees to 120 degrees, the voltage waveform applied to the motor 20 is changed in the opposite order, from (f) to (a). That is, firstly, the motor controller 24 gradually decreases the conduction angle while maintaining the conduction start timing (f→e→d), and thereafter makes the conduction start timing gradually later while maintaining the conduction angle (d→c→b→a). According to this procedure, an abrupt change in the number of rotations of the motor 20 can be suppressed. In the example shown in FIG. 11, an advance angle is zero degrees when the conduction angle is 120 degrees, however, the advance angle is 15 degrees when the conduction angle is 150 degrees. As above, the advance angle may also be changed accompanying the change in the conduction angle.

The conduction angle may be changed in accordance with manipulation by the user or automatically by the electric power tool 10. As an embodiment, the motor controller 24 may automatically change the conduction angle in accordance with an operation state of the electric power tool 10. In this case, the electric power tool 10 may be provided with various detectors and switches. In further detail, as shown in FIG. 7, the electric power tool 10 may be provided with at least one of a current detector 58, an output shaft speed detector 62, a voltage detector 64, a motor temperature detector 66, and a FET temperature detector 68. The current detector 58 is configured to detect a current of the motor 20. The output shaft speed detector 62 is configured to detect a rotational speed of the output shaft 46. The rotational speed of the output shaft 46 is equal to the rotational speed of the tool chuck 14 (that is, the tool). The voltage detector 64 is configured to detect a voltage of the battery pack 18. The motor temperature detector 66 is configured to detect a temperature of the motor 20. Further, the FET temperature detector 68 is configured to detect temperatures of the switching elements Q1 to Q6 of the inverter circuit 50. Although the rotational speed of the motor 20 can be detected by the motor position detector 56, it can also be estimated from a detected value of the output shaft speed detector 62. Further, the electric power tool 10 may be provided with a battery communication module 70 configured to communicate with the battery pack 18. The battery communication module 70 may be connected to the microprocessor 54 of the motor controller 24, by which the motor controller 24 can acquire various condition indexes from the battery pack 18.

The current of the motor 20, the rotational speed of the motor 20, the rotational speed of the output shaft 46, the temperature of the motor 20, the voltage of the battery pack 18, and the temperatures of the switching elements Q1 to Q6 are condition indexes that vary in accordance with a load applied to the tool. For example, with a larger load applied to the tool, the current of the motor 20, the temperature of the motor 20, and the temperatures of the switching elements Q1 to Q6 increase while the rotational speed of the motor 20, the rotational speed of the output shaft 46, and the voltage of the battery pack 18 decrease. The motor controller 24 can set the conduction angle in accordance with the load applied to the tool by changing the conduction angle in accordance with these condition indexes.

The motor controller 24 may store at least one threshold value for corresponding one of the aforementioned condition indexes. In this case, the at least one threshold value may be stored in a memory 54a of the microprocessor 54. In this case, the motor controller 24 may change the conduction angle based on a magnitude relationship between the condition index and the at least one threshold value. Although this is merely an example, in a case where the condition index is the current of the motor 20, the motor controller 24 may set the conduction angle to 120 degrees when the current of the motor 20 exceeds the threshold value, and may set the conduction angle to 150 degrees when the current of the motor 20 is below the threshold value.

The aforementioned at least one threshold value may include a first threshold value and a second threshold value. In this case, when the conduction angle is set at 120 degrees, the motor controller 24 may change the conduction angle to 150 degrees based on a magnitude relationship between the condition index and the first threshold value. Further, when the conduction angle is set at 150 degrees, the motor controller 24 may change the conduction angle to 120 degrees based on a magnitude relationship between the condition index and the second threshold value. According to such a configuration, an unnecessary change in the conduction angle can be suppressed even when the condition index varies with very small amplitude near the threshold value. An example of a flowchart for such an embodiment is shown in FIG. 12.

Figure 12:
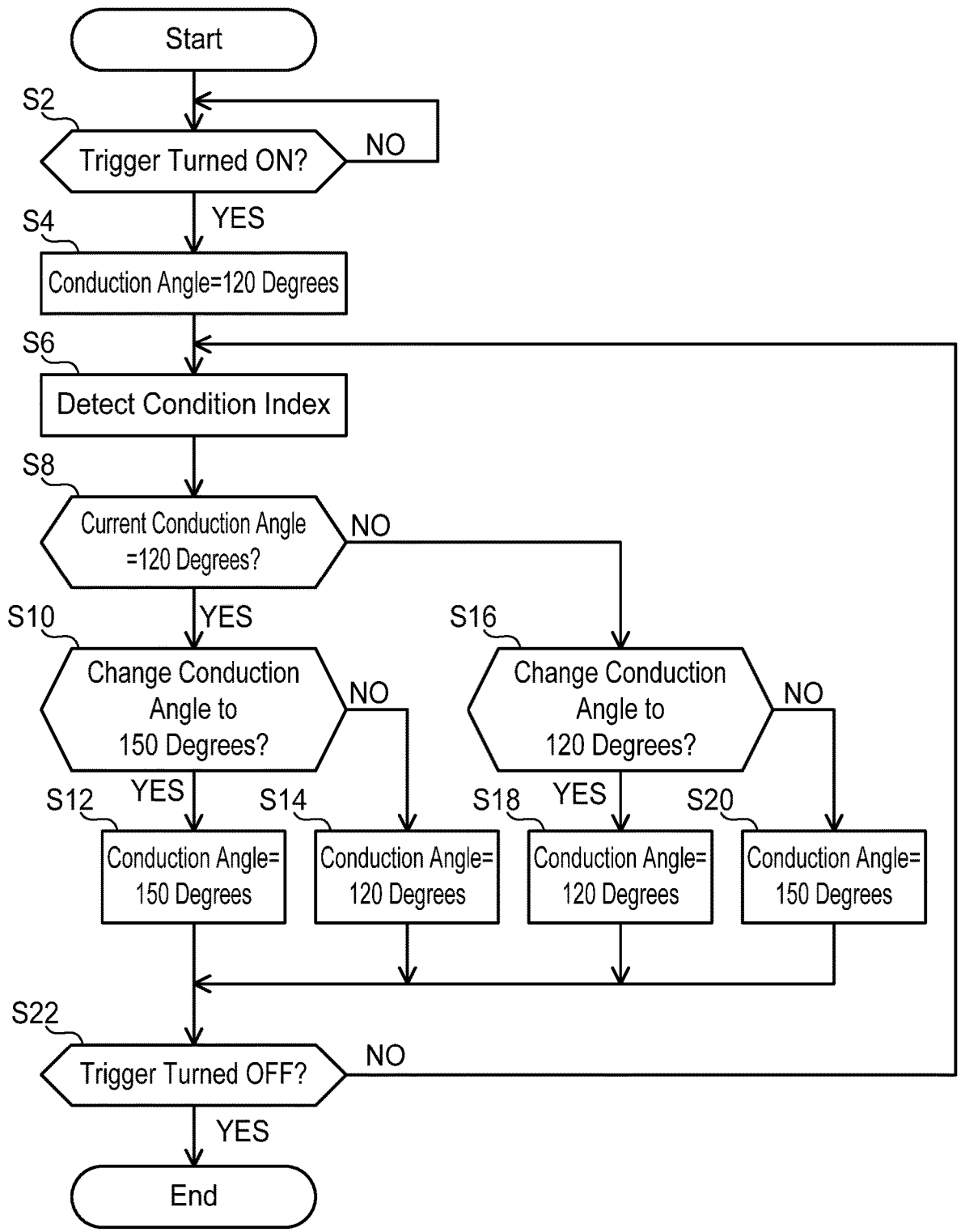
FIG. 12 is a flowchart showing an example of process which a motor controller 24 performs.

As shown in FIG. 12, when the user manipulates the trigger switch 30 (YES in S2), the motor controller 24 starts to drive the motor 20. At this occasion, the motor controller 24 firstly sets the conduction angle to 120 degrees (S4). The motor controller 24 detects the condition index while driving the motor 20 (S6). Then, when the current conduction angle is 120 degrees (YES in S8), the motor controller 24 determines whether or not the conduction angle is to be changed to 150 degrees based on the magnitude relationship between the condition index and the first threshold value (S10). For example, in a case where the condition index is the current of the motor 20, the motor controller 24 changes the conduction angle to 150 degrees (S12) when the current of the motor 20 is below the first threshold value (YES in S10). On the other hand, when the current of the motor 20 exceeds the first threshold value (NO in S10), the motor controller 24 maintains the conduction angle at 120 degrees (S14).

On the other hand, when the current conduction angle is 150 degrees (NO in S8), the motor controller 24 determines whether or not the conduction angle is to be changed to 120 degrees based on the magnitude relationship between the condition index and the second threshold value (S16). For example, in a case where the condition index is the current of the motor 20, the motor controller 24 changes the conduction angle to 120 degrees (S18) when the current of the motor 20 exceeds the second threshold value (YES in S16). On the other hand, when the current of the motor 20 is below the second threshold value (NO in S16), the motor controller 24 maintains the conduction angle at 150 degrees (S20). Here, in this case where the condition index is the current of the motor 20, the second threshold value may be a value larger than the first threshold value. Further, while the user is manipulating the trigger switch 30 (NO in S22), the motor controller 24 repeatedly performs the processes of steps S8 to S20.

In a case where the condition index is the rotational speed of the motor 20, in step S10 of FIG. 12, the motor controller 24 may change the conduction angle to 150 degrees (S12) when the rotational speed of the motor 20 exceeds the first threshold value (YES in S10). On the other hand, when the rotational speed of the motor 20 is below the first threshold value (NO in S10), the motor controller 24 may maintain the conduction angle at 120 degrees (S14). Further, in step S16 of FIG. 12, the motor controller 24 may change the conduction angle to 120 degrees (S18) when the rotational speed of the motor 20 is below the second threshold value (YES in S16). On the other hand, when the rotational speed of the motor 20 exceeds the second threshold value (NO in S16), the motor controller 24 may maintain the conduction angle at 150 degrees (S20). Here, in this case where the condition index is the rotational speed of the motor 20, the second threshold value may be a value smaller than the first threshold value. Further, the same applies to a case where the condition index is the rotational speed of the output shaft 46.

In a case where the condition index is the temperature of the motor 20, in step S10 of FIG. 12, the motor controller 24 may change the conduction angle to 150 degrees (S12) when the temperature of the motor 20 is below the first threshold value (YES in S10). On the other hand, when the temperature of the motor 20 exceeds the first threshold value (NO in S10), the motor controller 24 may maintain the conduction angle at 120 degrees (S14). Further, in step S16 of FIG. 12, the motor controller 24 may change the conduction angle to 120 degrees (S18) when the temperature of the motor 20 exceeds the second threshold value (YES in S16). On the other hand, when the temperature of the motor 20 is below the second threshold value (NO in S16), the motor controller 24 may maintain the conduction angle at 150 degrees (S20). Here, in this case where the condition index is the temperature of the motor 20, the second threshold value may be a value larger than the first threshold value. Further, the same applies to a case where the condition index is the temperatures of the switching elements Q1 to Q6.

In a case where the condition index is the voltage of the battery pack 18, in step S10 of FIG. 12, the motor controller 24 may change the conduction angle to 150 degrees (S12) when the voltage of the battery pack 18 exceeds the first threshold value (YES in S10). On the other hand, when the voltage of the battery pack 18 is below the first threshold value (NO in S10), the motor controller 24 may maintain the conduction angle at 120 degrees (S14). Further, in step S16 of FIG. 12, the motor controller 24 may change the conduction angle to 120 degrees (S18) when the voltage of the battery pack 18 is below the second threshold value (YES in S16). On the other hand, when the voltage of the battery pack 18 exceeds the second threshold value (NO in S16), the motor controller 24 may maintain the conduction angle at 150 degrees (S20). Here, in this case where the condition index is the voltage of the battery pack 18, the second threshold value may be a value smaller than the first threshold value.

In another embodiment, the motor controller 24 may be configured to selectively perform a first drive mode in which the conduction angle is maintained at a fixed conduction angle and a second drive mode in which the conduction angle is changed between 120 degrees and 150 degrees. In this case, the motor controller 24 may select either the first drive mode or the second drive mode in accordance with manipulation by the user. Further, when the second drive mode is selected, the motor controller 24 may automatically change the conduction angle in accordance with the operation state of the electric power tool 10. In this embodiment, the electric power tool 10 may be provided with a drive mode setting switch 78 (see FIG. 7). The drive mode setting switch 78 is an example of the manipulation member that is to be manipulated by the user for switching between the first drive mode and the second drive mode. The drive mode setting switch 78 is connected to the microprocessor 54 of the motor controller 24. According to such a configuration, the motor controller 24 can selectively perform either the first drive mode or the second drive mode in accordance with the manipulation applied to the drive mode setting switch 78. A specific configuration of the drive mode setting switch 78 is not particularly limited.

Figure 13:
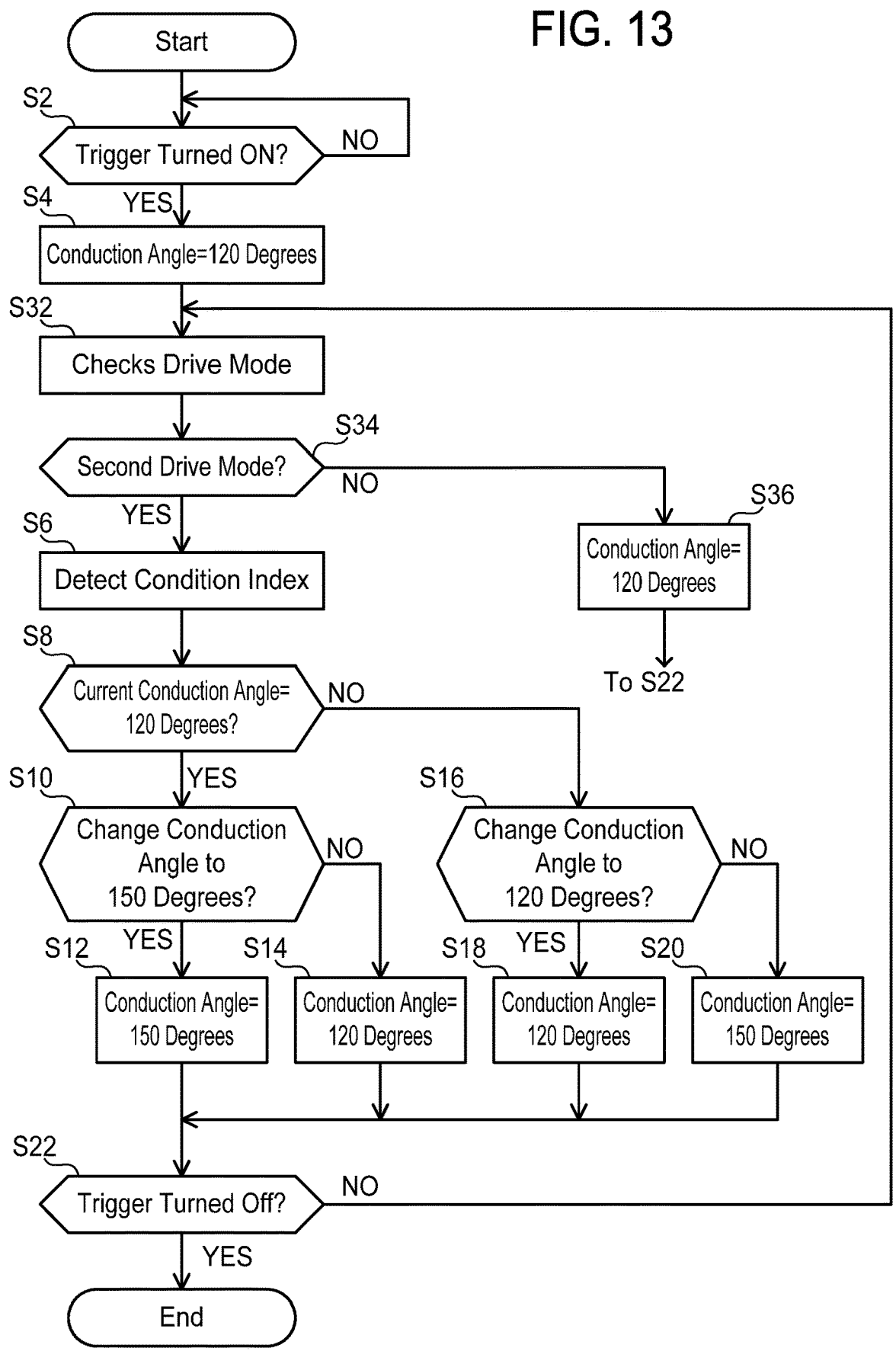
FIG. 13 is a flowchart showing an example of process which the motor controller 24 performs.

An example of a flowchart of the aforementioned embodiment is shown in FIG. 13. In the flowchart shown in FIG. 13, processes of steps S32, S34, S36 are added between step S4 and step S6 as compared to the flowchart of FIG. 12. As shown in FIG. 13, when the user manipulates the trigger switch 30 (YES in S2), the motor controller 24 starts to drive the motor 20. At this occasion, the motor controller 24 firstly sets the conduction angle to 120 degrees (S4). Next, the motor controller 24 checks a drive mode selected by the drive mode setting switch 78 (S32). If the first drive mode is selected (NO in S34), the motor controller 24 sets or maintains the conduction angle at 120 degrees (S36) and proceeds to the process of step S22. Thus, the conduction angle is fixed at 120 degrees while the first drive mode is selected.

On the other hand, if the second drive mode is selected (YES in S34), the motor controller 24 proceeds to the process of step S6. Since the processes (S6 to S22) in the second drive mode are same as those described for the flowchart of FIG. 12, redundant explanation thereof will be omitted.

In another embodiment, the motor controller 24 may selectively perform either the first drive mode or the second drive mode in accordance with the reduction ratio set in the gear reducer 22. For example, if the first reduction ratio is selected in the gear reducer 22, the motor controller 24 may perform the first drive mode, and if the second reduction ratio is selected in the gear reducer 22, the motor controller 24 may perform the second drive mode. As described above, the reduction ratio set in the gear reducer 22 is detected by the gear position detector 60. The motor controller 24 can use the gear position detector 60 to check the reduction ratio set in the gear reducer 22. Alternatively, the motor controller 24 may detect the reduction ratio set in the gear reducer 22 based on a detected value by the output shaft speed detector 62. The reduction ratio of the gear reducer 22 can be estimated based on a relationship between the rotational speed of the motor 20 and the rotational speed of the output shaft 46.

Figure 14:
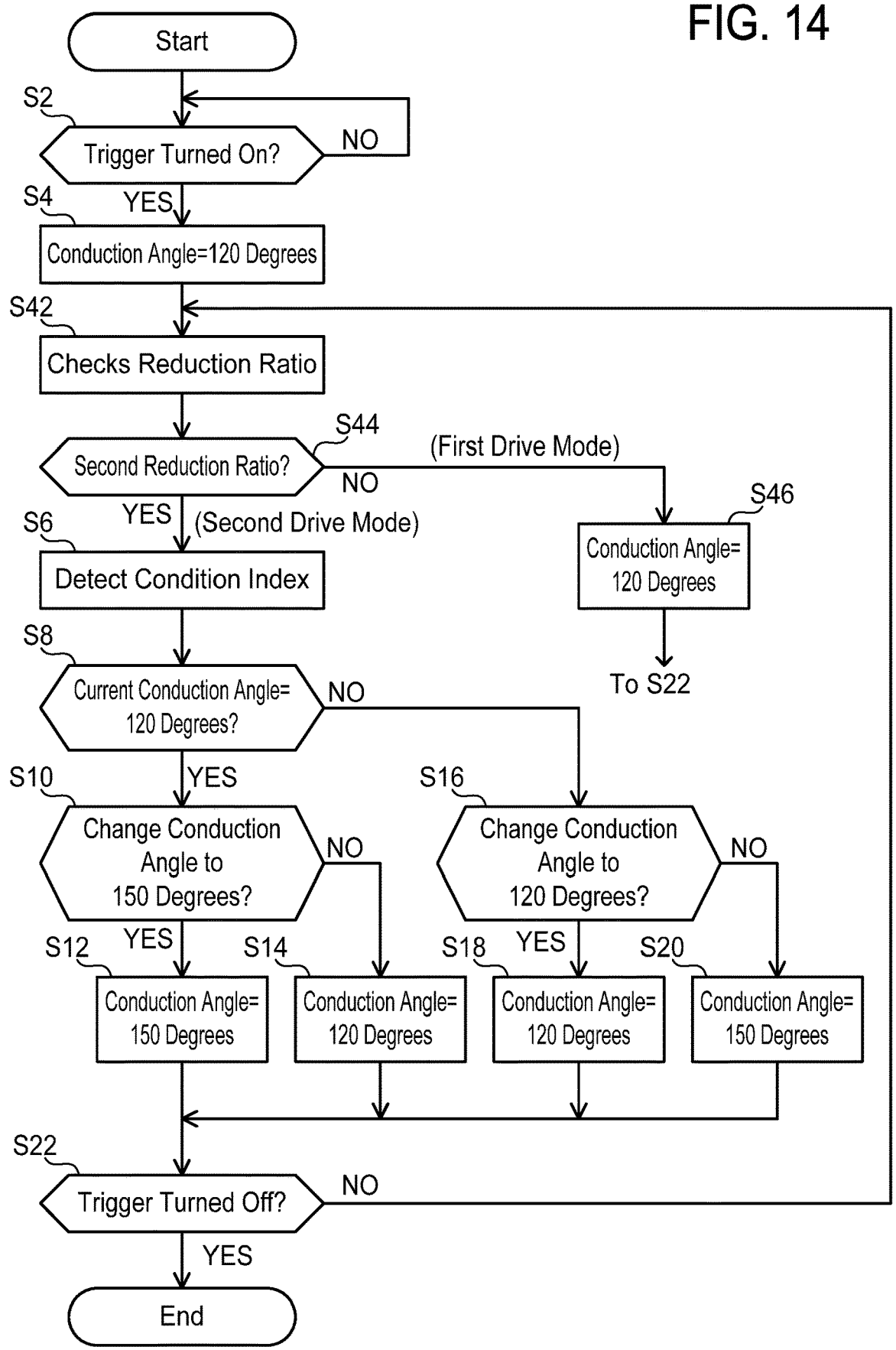
FIG. 14 is a flowchart showing an example of process which the motor controller 24 performs.

An example of a flowchart in the aforementioned embodiment is shown in FIG. 14. In the flowchart shown in FIG. 14, processes of steps S42, S44, S46 are added between step S4 and step S6 as compared to the flowchart of FIG. 12. As shown in FIG. 14, when the user manipulates the trigger switch 30 (YES in S2), the motor controller 24 starts to drive the motor 20. At this occasion, the motor controller 24 firstly sets the conduction angle to 120 degrees (S4). Next, the motor controller 24 checks a reduction ratio set in the gear reducer 22 (S42). If the first reduction ratio is set in the gear reducer 22 (NO in S44), the motor controller 24 proceeds to the process of S46 to perform the first drive mode. The motor controller 24 sets or maintains the conduction angle at 120 degrees (S46) and proceeds to the process of step S22. While the first reduction ratio is set in the gear reducer 22, the processes of steps S42, S44, S46, S22 are repeatedly performed, and the conduction angle is fixed at 120 degrees.

On the other hand, if the second reduction ratio is set in the gear reducer 22 (YES in S44), the motor controller 24 proceeds to the process of step S6 to perform the second drive mode. Since the processes (S6 to S22) in the second drive mode are same as those described for the flowchart of FIG. 12, redundant explanation thereof will be omitted.

In another embodiment, the motor controller 24 may selectively perform either the first drive mode or the second drive mode in accordance with the rotational direction of the tool (that is, the tool chuck 14). For example, the motor controller 24 may perform the second drive mode when the rotational direction of the tool is set in the forward direction, and may perform the first drive mode when the rotational direction of the tool is set in the reverse direction. As described above, the rotational direction selection switch 34 is connected to the motor controller 24. As such, the motor controller 24 can selectively perform either the first drive mode or the 35 second drive mode in accordance with manipulation applied to the rotational direction selection switch 34.

Figure 15:
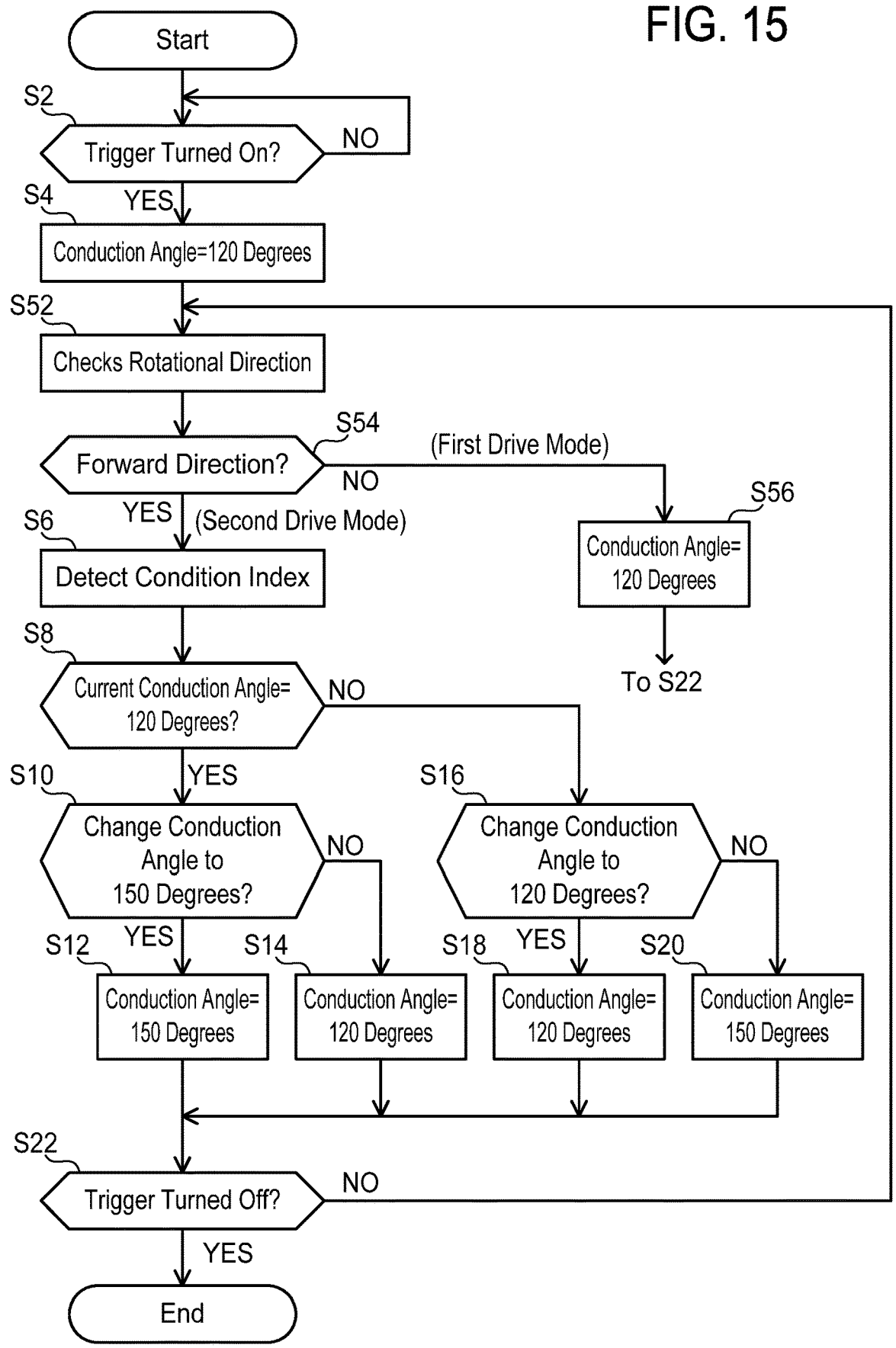
FIG. 15 is a flowchart showing an example of process which the motor controller 24 performs.

An example of a flowchart of the aforementioned embodiment is shown in FIG. 15. In the flowchart shown in FIG. 15, processes of steps S52, S54, S56 are added between step S4 and step S6 as compared to the flowchart of FIG. 12. As shown in FIG. 15, when the user manipulates the trigger switch 30 (YES in S2), the motor controller 24 starts to drive the motor 20. At this occasion, the motor controller 24 firstly sets the conduction angle to 120 degrees (S4). Next, the motor controller 24 checks a rotational direction set by the rotational direction selection switch 34 (S52). If the selected rotational direction is the reverse direction (NO in S54), the motor controller 24 proceeds to the process of step S56 to perform the first drive mode. The motor controller 24 sets or maintains the conduction angle at 120 degrees (S56) and proceeds to the process of step S22. While the rotational direction is set in the reverse direction, the processes of steps S52. S54. S56. S22 are repeatedly performed, and the conduction angle is fixed at 120 degrees.

On the other hand, if the rotational direction selected by the rotational direction selection switch 34 is the forward direction (YES in S54), the motor controller 24 proceeds to the process of step S6 to perform the second drive mode. Since the processes (S6 to S22) in the second drive mode are same as those described for the flowchart of FIG. 12, redundant explanation thereof will be omitted.

In another embodiment, the motor controller 24 may selectively perform either the first drive mode or the second drive mode in accordance with the reduction ratio set in the gear reducer 22 and the rotational direction of the tool (that is, the tool chuck 14). In this case, the motor controller 24 can select either the first drive mode or the second drive mode based on manipulation applied to the gear selection switch 32 and manipulation applied to the rotational direction selection switch 34. Although this is merely an example, the motor controller 24 may select the second drive mode in which the conduction angle is changed only when the gear selection switch 32 is manipulated to the second position (the second reduction ratio) and the rotational direction selection switch 34 is manipulated to the third position (the forward direction).

Figure 16:
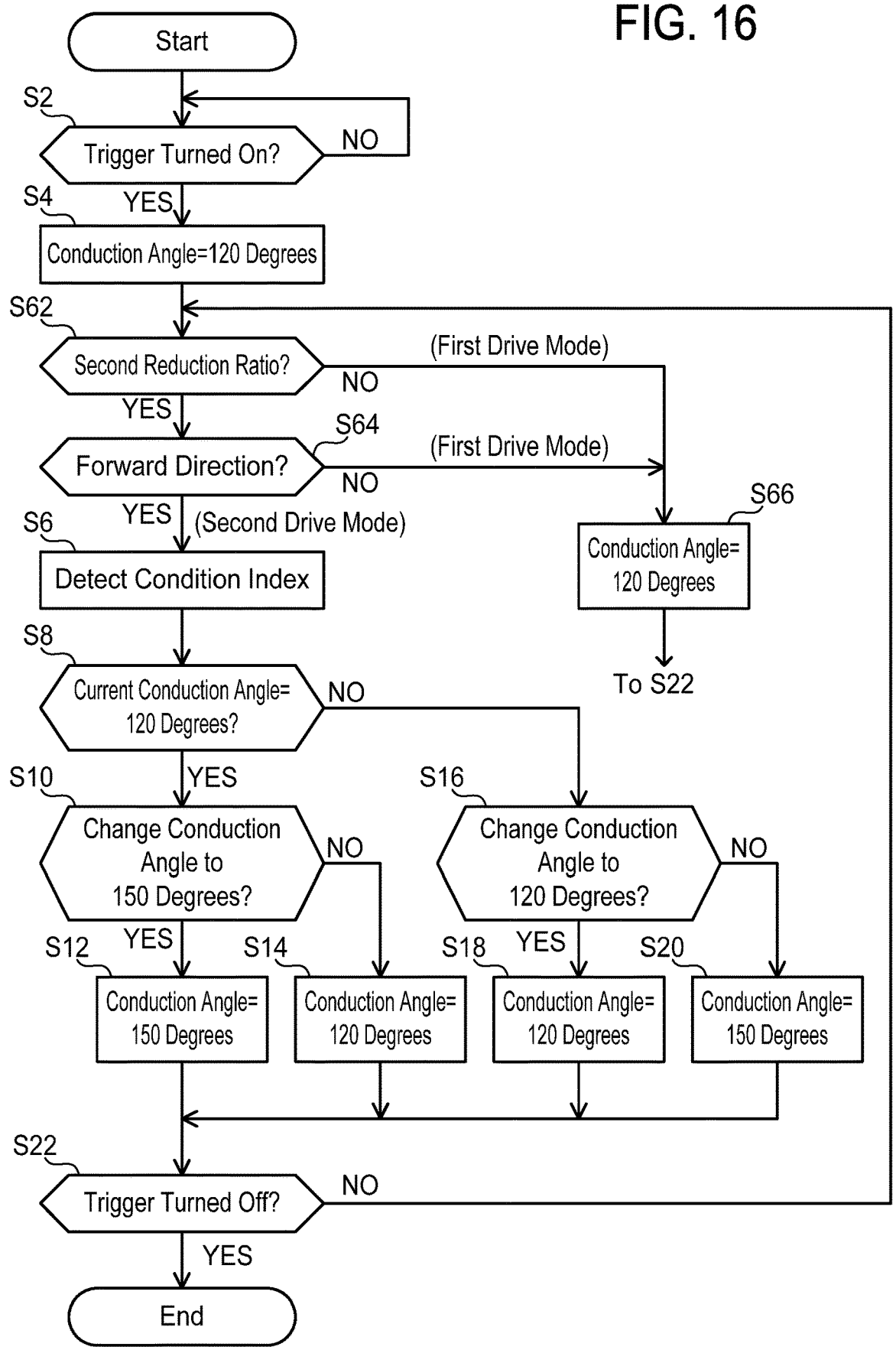
FIG. 16 is a flowchart showing an example of process which the motor controller 24 performs.

An example of a flowchart of the aforementioned embodiment is shown in FIG. 16. In the flowchart shown in FIG. 16, processes of steps S62, S64. S66 are added between step S4 and step S6 as compared to the flowchart of FIG. 12. As shown in FIG. 16, when the user manipulates the trigger switch 30 (YES in S2), the motor controller 24 starts to drive the motor 20. At this occasion, the motor controller 24 firstly sets the conduction angle to 120 degrees (S4). Next, the motor controller 24 checks a reduction ratio set in the gear reducer 22 (S62). If the gear selection switch 32 is manipulated to the first position and the first reduction ratio is set in the gear reducer 22 (NO in S62), the motor controller 24 proceeds to the process of S66 to perform the first drive mode. The motor controller 24 sets or maintains the conduction angle at 120 degrees (S66) and proceeds to the process of step S22. Thus, while the first reduction ratio is set in the gear reducer 22, the motor controller 24 performs the first drive mode.

On the other hand, if the gear selection switch 32 is manipulated to the second position and the second reduction ratio is set in the gear reducer 22 (YES in S62), the motor controller 24 proceeds to the process of step S64. In step S64, the motor controller 24 checks a rotational direction set by the rotational direction selection switch 34. If the rotational direction selection switch 34 is manipulated to the fourth position and the selected rotational direction is the reverse direction (NO in S64), the motor controller 24 proceeds to the process of S66 to perform the first drive mode. The motor controller 24 sets or maintains the conduction angle at 120 degrees (S66) and proceeds to the process of step S22. Thus, while the second reduction ratio is set in the gear reducer 22, the motor controller 24 performs the first drive mode.

Contrary to the above, if the second reduction ratio is set in the gear reducer 22 (YES in S62) and the rotational direction is set in the forward direction (YES in S64), the motor controller 24 proceeds to the process of S6 to perform the second drive mode. Since the processes (S6 to S22) in the second drive mode are same as those described for the flowchart of FIG. 12, redundant explanation thereof will be omitted. As above, according to the present embodiment, the second drive mode in which the conduction angle is changed is performed only when the gear selection switch 32 is manipulated to the second position (the second reduction ratio) and the rotational direction selection switch 34 is manipulated to the third position (the forward direction).

In another embodiment, the motor controller 24 may change the conduction angle in accordance with a detected condition index, regardless of the reduction ratio set in the gear reducer 22. In this case as well, the motor controller 24 can change the conduction angle based on the magnitude relationship(s) between the condition index and one or more threshold values. In regard to this point, the motor controller 24 may change the condition for changing the conduction angle in accordance with the reduction ratio of the gear reducer 22. For example, the motor controller 24 may store a first threshold value, a second threshold value, a third threshold value, and a fourth threshold value in the memory 54*a*. Further, the motor controller 24 may use the first threshold value and the second threshold value when the reduction ratio of the gear reducer 22 is the first reduction ratio (that is, in low-speed), and may use the third threshold value and the fourth threshold value when the reduction ratio of the gear reducer 22 is the second reduction ratio (that is, in high-speed).

Figure 17:
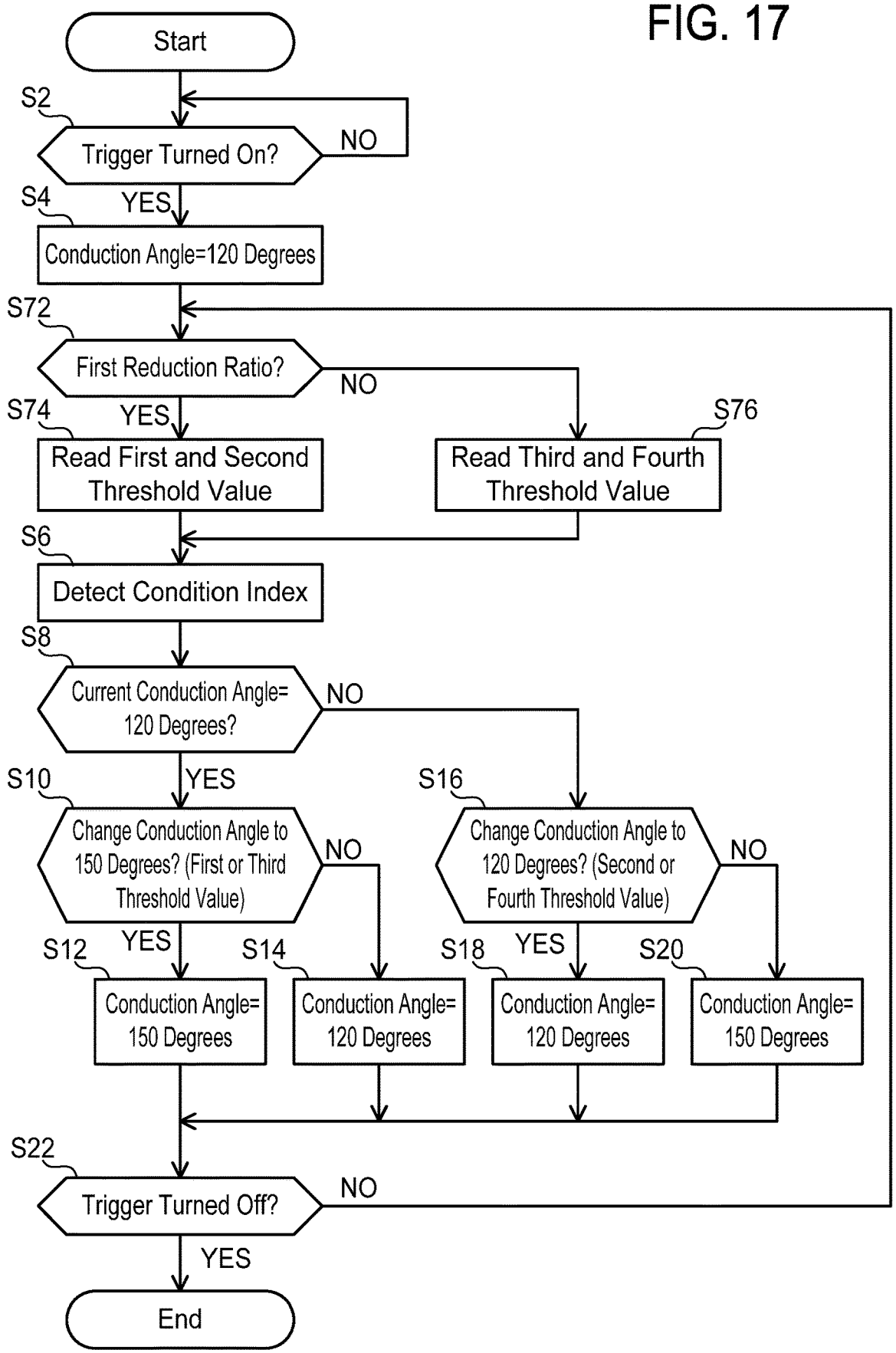
FIG. 17 is a flowchart showing an example of process which the motor controller 24 performs.

An example of a flowchart of the aforementioned embodiment is shown in FIG. 17. In the flowchart shown in FIG. 17, processes of steps S72, S74, S76 are added between step S4 and step S6 as compared to the flowchart of FIG. 12. As shown in FIG. 17, when the user manipulates the trigger switch 30 (YES in S2), the motor controller 24 starts to drive the motor 20. At this occasion, the motor controller 24 firstly sets the conduction angle to 120 degrees (S4). Next, the motor controller 24 checks a reduction ratio set in the gear reducer 22 (S72). If the gear selection switch 32 is manipulated to the first position and the first reduction ratio is set in the gear reducer 22 (YES in S72), the motor controller 24 reads the first threshold value and the second threshold value from the memory 54a (S74). Since the subsequent processes S6 to S22 are same as those described for the flowchart of FIG. 12, redundant explanation thereof will be omitted. In the process of step S10, whether or not the conduction angle is to be changed to 150 degrees is determined based on a magnitude relationship between the detected condition index and the first threshold value. In the process of step S16, whether or not the conduction angle is to be changed to 120 degrees is determined based on a magnitude relationship between the detected condition index and the second threshold value.

On the other hand, if the gear selection switch 32 is manipulated to the second position and the second reduction ratio is set in the gear reducer 22 (NO in S72), the motor controller 24 reads the third threshold value and the fourth threshold value from the memory 54a (S76). Since the subsequent processes S6 to S22 are same as those described for the flowchart of FIG. 12, redundant explanation thereof will be omitted. In the process of step S10, whether or not the conduction angle is to be changed to 150 degrees is determined based on a magnitude relationship between the detected condition index and the third threshold value. In the process of step S16, whether or not the conduction angle is to be changed to 120 degrees is determined based on a magnitude relationship between the detected condition index and the fourth threshold value. That is, the third threshold value is used as a substitute for the first threshold value, and the fourth threshold value is used as a substitute for the second threshold value.

A magnitude relationship between the third threshold value and the fourth threshold value differs depending on the type of the condition index, however, it is same as the magnitude relationship between the first threshold value and the second threshold value. That is, in a case where the condition index is the current of the motor 20, the fourth threshold value may be a value larger than the third threshold value. In a case where the condition index is the rotational speed of the motor 20 or the output shaft 46, the fourth threshold value may be a value smaller than the third threshold value. In a case where the condition index is the temperature of the motor 20 or the temperatures of the switching elements Q1 to Q6, the fourth threshold value may be a value larger than the third threshold value. Further, in a case where the condition index is the voltage of the battery pack 18, the fourth threshold value may be a value smaller than the third threshold value.

A magnitude relationship between the first threshold value and the third threshold value and a magnitude relationship between the second threshold value and the fourth threshold value are not particularly limited, however, each of the threshold values may be set so that the conduction angle is less likely to be set to 150 degrees when the reduction ratio of the gear reducer 22 is larger. For example, in a case where the condition index is the current of the motor 20, the first threshold value may be a value smaller than the third threshold value, and the second threshold value may be a value smaller than the fourth threshold value. In a case where the condition index is the rotational speed of the motor 20 or the output shaft 46, the first threshold value may be a value larger than the third threshold value, and the second threshold value may be a value larger than the fourth threshold value. In a case where the condition index is the temperature of the motor 20 or the temperatures of the switching elements Q1 to Q6, the first threshold value may be a value smaller than the third threshold value, and the second threshold value may be a value smaller than the fourth threshold value. Further, in a case where the condition index is the voltage of the battery pack 18, the first threshold value may be a value larger than the third threshold value, and the second threshold value may be a value larger than the fourth threshold value.

Figure 18:
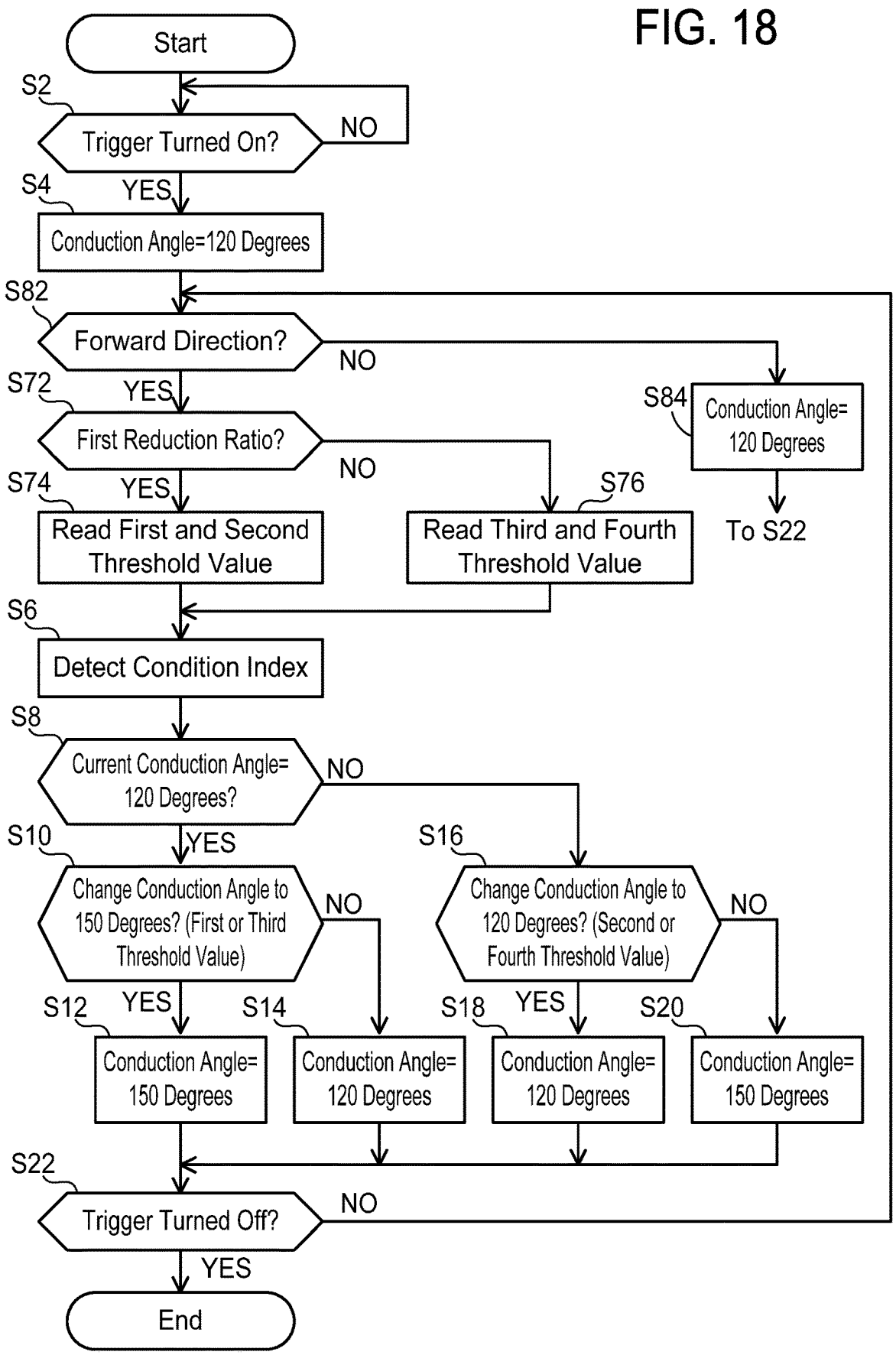
FIG. 18 is a flowchart showing an example of process which the motor controller 24 performs.

As another embodiment, the motor controller 24 may selectively perform either the first drive mode in which the conduction angle is not changed or the second drive mode in which the conduction angle is changed in accordance with the rotational direction of the tool (that is, the tool chuck 14). Further, in the second drive mode, the conduction angle may be changed by using different threshold values in accordance with the reduction ratio of the gear reducer 22. An example of a flowchart of such an embodiment is shown in FIG. 18. In the flowchart shown in FIG. 18, processes of steps S82, S84 are added between step S4 and step S72 as compared to the flowchart of FIG. 17. As shown in FIG. 18, when the user manipulates the trigger switch 30 (YES in S2), the motor controller 24 starts to drive the motor 20. At this occasion, the motor controller 24 firstly sets the conduction angle to 120 degrees (S4). Next, the motor controller 24 checks a rotational direction set by the rotational direction selection switch 34 (S82). If the selected rotational direction is the reverse direction (NO in S82), the motor controller 24 proceeds to the process of step S84 to perform the first drive mode. The motor controller 24 sets or maintains the conduction angle at 120 degrees (S84) and proceeds to the process of step S22. While the rotational direction is set in the reverse direction, the processes of steps S82, S84. S22 are repeatedly performed, and the conduction angle is fixed at 120 degrees.

On the other hand, if the rotational direction selected by the rotational direction selection switch 34 is the forward direction (YES in S82), the motor controller 24 proceeds to the process of step S72 to perform the second drive mode. Since the processes (S72 to S76, S6 to S22) in the second drive mode are same as those described for the flowchart of FIG. 17, redundant explanation thereof will be omitted. According to this embodiment, the motor controller 24 performs the second drive mode when the rotational direction selection switch 34 is manipulated to the third position and the rotational direction is set in the forward direction. In the second drive mode, when the reduction ratio of the gear reducer 22 is the first reduction ratio and the conduction angle is set at 120 degrees, the conduction angle is changed to 150 degrees based on the magnitude relationship between the condition index and the first threshold value. When the reduction ratio of the gear reducer 22 is the first reduction ratio and the conduction angle is set at 150 degrees, the conduction angle is changed to 120 degrees based on the magnitude relationship between the condition index and the second threshold value. On the other hand, when the reduction ratio of the gear reducer 22 is the second reduction ratio and the conduction angle is set at 120 degrees, the conduction angle is changed to 150 degrees based on the magnitude relationship between the condition index and the third threshold value. When the reduction ratio of the gear reducer 22 is the second reduction ratio and the conduction angle is set at 150 degrees, the conduction angle is changed to 120 degrees based on the magnitude relationship between the condition index and the fourth threshold value.

Figure 7:
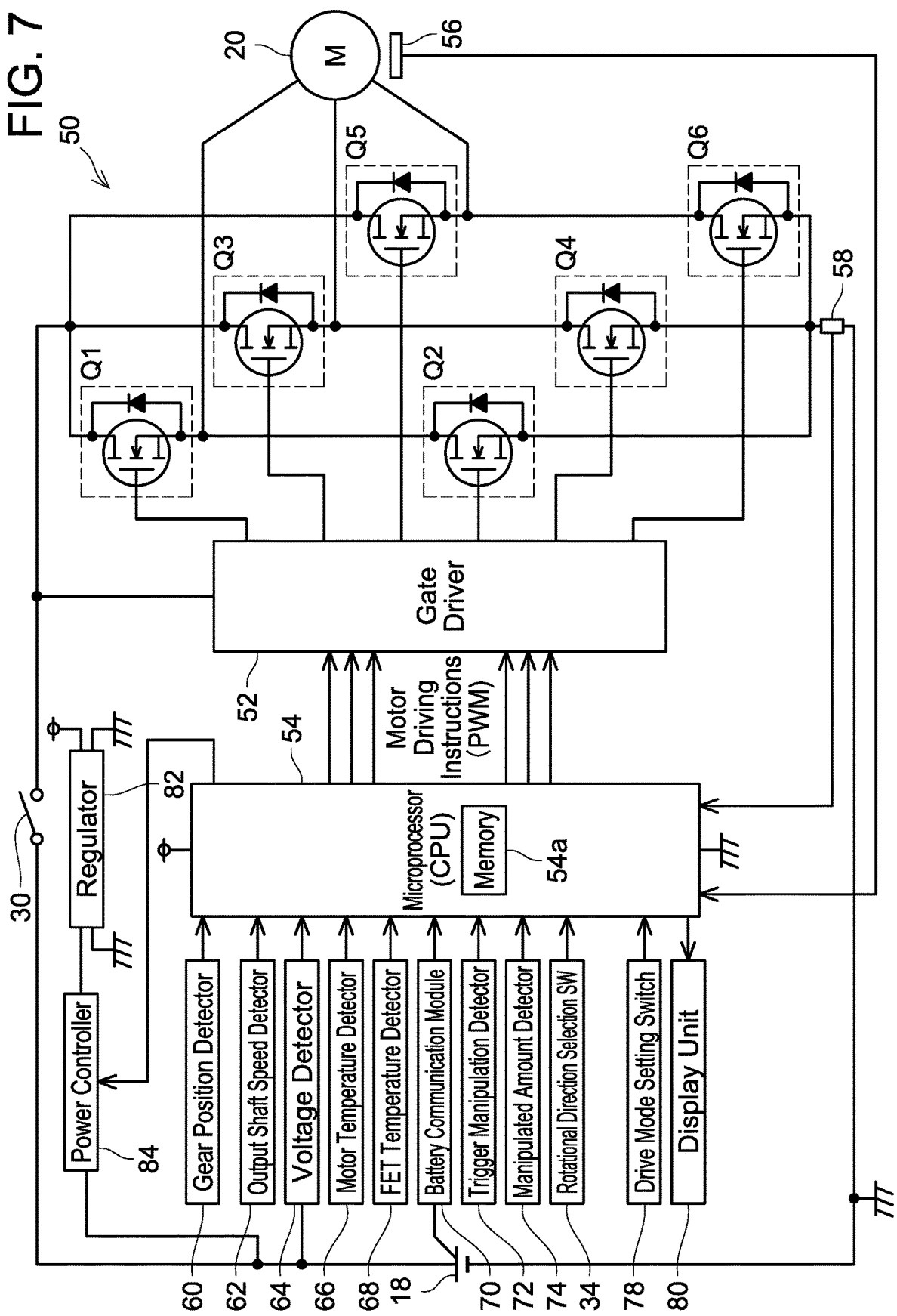
FIG. 7 is a circuitry block diagram showing an electric configuration of the electric power tool 10 according to the embodiment.

As shown in FIGS. 1, 3, and 7, the electric power tool 10 of the present embodiments may be provided with a display unit 80. In this case, the display unit 80 may display at least one of the conduction angle set by the motor controller 24, the drive mode which the motor controller 24 is performing, the reduction ratio selected by the gear selection switch 32, the rotational direction selected by the rotational direction selection switch 34, a charge level of the battery pack 18, and the load applied to the tool. Instead of the display unit 80, the electric power tool 10 may include another notifier configured to notify information to the user. For example, as the notifier, the electric power tool 10 may include a transmitter configured to send information wirelessly to a portable terminal (such as a smartphone) of the user. Alternatively, the electric power tool 10 may be provided with an element or a device configured to notify the user of such information by buzzer or audio.

What is claimed is:

1. An electric power tool comprising:
   a three-phase brushless motor configured to drive a tool;
   a gear reducer provided between the motor and the tool, the gear reducer being configured to selectively change a reduction ratio from the motor to the tool between a first reduction ratio and a second reduction ratio; and
   a motor controller configured to drive the motor with rectangular waves, the motor controller being configured to selectively change a conduction angle of each rectangular wave between at least a first conduction angle and a second conduction angle.

2. The electric power tool according to claim 1, wherein the motor controller is configured to selectively perform a first drive mode in which the conduction angle is maintained at a fixed conduction angle and a second drive mode in which the conduction angle is selectively changed between at least the first conduction angle and the second conduction angle.

3. The electric power tool according to claim 2, further comprising:
   at least one manipulation member configured to be manipulated by a user,
   wherein the motor controller is configured to selectively perform either the first drive mode or the second drive mode in accordance with manipulation applied to the at least one manipulation member.

4. The electric power tool according to claim 3, wherein the at least one manipulation member comprises a first manipulation member for switching between the first drive mode and the second drive mode, and
   the motor controller is configured to selectively perform either the first drive mode or the second drive mode in accordance with manipulation applied to the first manipulation member.

5. The electric power tool according to claim 3, wherein the at least one manipulation member comprises a second manipulation member for changing the reduction ratio of the gear reducer between the first reduction ratio and the second reduction ratio, and
   the motor controller is configured to selectively perform either the first drive mode or the second drive mode in accordance with manipulation applied to the second manipulation member.

6. The electric power tool according to claim 5, wherein the second manipulation member is configured to be manipulated between a first position and a second position by the user,
   when the second manipulation member is manipulated to the first position, the gear reducer sets the reduction ratio at the first reduction ratio and the motor controller selects the first drive mode, and
   when the second manipulation member is manipulated to the second position, the gear reducer sets the reduction ratio at the second reduction ratio and the motor controller selects the second drive mode.

7. The electric power tool according to claim 6, wherein the second reduction ratio is smaller than the first reduction ratio.

8. The electric power tool according to claim 3, wherein the at least one manipulation member comprises a third manipulation member for switching a rotational direction of the tool between a forward direction and a reverse direction, and
   the motor controller is configured to selectively perform either the first drive mode or the second drive mode in accordance with manipulation applied to the third manipulation member.

9. The electric power tool according to claim 8, wherein the third manipulation member is configured to be manipulated between a third position and a fourth position by the user,
   when the third manipulation member is manipulated to the third position, the rotational direction of the tool is set to the forward direction and the motor controller selects the second drive mode, and
   when the third manipulation member is manipulated to the fourth position, the rotational direction of the tool is set to the reverse direction and the motor controller selects the first drive mode.

10. The electric power tool according to claim 3, wherein the at least one manipulation member comprises a second manipulation member configured to be manipulated between a first position and a second position by the user and a third manipulation member configured to be manipulated between a third position and a fourth position by the user,
    the second manipulation member is configured such that the reduction ratio of the gear reducer is set to the first reduction ratio when the second manipulation member is manipulated to the first position, and such that the reduction ratio of the gear reducer is set to the second reduction ratio when the second manipulation member is manipulated to the second position,
    the third manipulation member is configured such that a rotational direction of the tool is set to a forward direction when the third manipulation member is manipulated to the third position, and such that the rotational direction of the tool is set to a reverse direction when the third manipulation member is manipulated to the fourth position, and
    the motor controller is configured to select the second drive mode only when the second manipulation member is manipulated to the second position and the third manipulation member is manipulated to the third position.

11. The electric power tool according to claim 1, wherein the motor controller is configured to change the conduction angle in accordance with a condition index which varies depending on load applied to the tool.

12. The electric power tool according to claim 11, wherein the condition index is at least one index selected from a group consisting of: a current of the motor, a rotational speed of the motor, a temperature of the motor, a voltage of a battery which supplies electric power to the motor, and a temperature of a switching element of the motor controller.

13. The electric power tool according to claim 11, wherein the motor controller is configured to store at least one threshold value regarding the condition index and change the conduction angle based on a magnitude relationship between the condition index and the at least one threshold value.

14. The electric power tool according to claim 13, wherein
the at least one threshold value includes a first threshold value and a second threshold value,
the motor controller is configured to change the conduction angle to the second conduction angle based on a magnitude relationship between the condition index and the first threshold value when the conduction angle is set to the first conduction angle, and
the motor controller is configured to change the conduction angle to the first conduction angle based on a magnitude relationship between the condition index and the second threshold value when the conduction angle is set at the second conduction angle.

15. The electric power tool according to claim 13, wherein
the at least one threshold value includes a first threshold value, a second threshold value, a third threshold value and a fourth threshold value,
the motor controller is configured to change the conduction angle to the second conduction angle based on a magnitude relationship between the condition index and the first threshold value when the reduction ratio of the gear reducer is set at the first reduction ratio and the conduction angle is set at the first conduction angle,
the motor controller is configured to change the conduction angle to the first conduction angle based on a magnitude relationship between the condition index and the second threshold value when the reduction ratio of the gear reducer is set at the first reduction ratio and the conduction angle is set at the second conduction angle,
the motor controller is configured to change the conduction angle to the second conduction angle based on a magnitude relationship between the condition index and the third threshold value when the reduction ratio of the gear reducer is set at the second reduction ratio and the conduction angle is set at the first conduction angle, and
the motor controller is configured to change the conduction angle to the first conduction angle based on a magnitude relationship between the condition index and the fourth threshold value when the reduction ratio of the gear reducer is set at the second reduction ratio and the conduction angle is set at the second conduction angle.

16. The electric power tool according to claim 1, further comprising a notifier configured to notify the conduction angle set by the motor controller.

17. The electric power tool according to claim 1, further comprising a notifier configured to notify the reduction ratio set by the gear reducer.

18. The electric power tool according to claim 1, further comprising a first detector configured to detect the reduction ratio set by the gear reducer.

19. The electric power tool according to claim 18, wherein the first detector comprises a non-contact sensor.

20. The electric power tool according to claim 1, further comprising:
a second detector configured to detect a rotational speed of the tool,
wherein the motor controller is configured to detect the reduction ratio set by the gear reducer based on a detected value by the second detector.

* * * * *